(12) United States Patent
Joshi et al.

(10) Patent No.: US 9,824,066 B2
(45) Date of Patent: Nov. 21, 2017

(54) 32-POINT TRANSFORM FOR MEDIA DATA CODING

(75) Inventors: Rajan Laxman Joshi, San Diego, CA (US); Yuriy Reznik, Seattle, WA (US); Joel Sole Rojals, La Jolla, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 717 days.

(21) Appl. No.: 13/346,632

(22) Filed: Jan. 9, 2012

(65) Prior Publication Data

US 2012/0177108 A1 Jul. 12, 2012

Related U.S. Application Data

(60) Provisional application No. 61/431,343, filed on Jan. 10, 2011, provisional application No. 61/433,015, (Continued)

(51) Int. Cl.
*G06F 17/14* (2006.01)
*H04N 19/625* (2014.01)

(52) U.S. Cl.
CPC ......... *G06F 17/147* (2013.01); *H04N 19/625* (2014.11)

(58) Field of Classification Search
CPC ......... G06F 17/14; G06F 7/147; G06F 17/147
(Continued)

(56) References Cited

U.S. PATENT DOCUMENTS 4,754,491 A * 6/1988 Mischler et al. ............. 382/250
4,841,464 A * 6/1989 Guichard .............. G06F 17/147
708/402

(Continued)

FOREIGN PATENT DOCUMENTS

CN 1428719 A 7/2003
CN 1436004 A 8/2003
(Continued)

OTHER PUBLICATIONS

Hong, Yoon Mi et al, Low-complexity 16×16 and 32×32 transforms and partial frequency transform, Oct. 2010, Joint Collaborative Team on Video Coding, 3rd Meeting, pp. 1-11.*

(Continued)

*Primary Examiner* — Tan V. Mai

(57) ABSTRACT

In general, techniques are described for implementing a 32-point discrete cosine transform (DCT) that is capable of applying multiple DCTs of different sizes. For example, an apparatus comprising a 32-point discrete cosine transform of type II (DCT-II) unit may implement the techniques of this disclosure. The 32-point DCT-II unit performs these DCTs-II of different sizes to transform data from a spatial to a frequency domain. The 32-point DCT-II unit includes an 16-point DCT-II unit that performs one of the DCTs-II of size 16 and at least one 8-point DCT-II unit that performs one of the DCTs-II of size 8. The 16-point DCT-II unit includes another 8-point DCT-II unit. The 16-point DCT-II unit also comprises at least one 4-point DCTs-II unit. Two or more of these DCTs-II units may concurrently perform DCTs-II of different sizes to various portions of the content data.

30 Claims, 13 Drawing Sheets

Related U.S. Application Data filed on Jan. 14, 2011, provisional application No. 61/433,351, filed on Jan. 17, 2011, provisional application No. 61/446,834, filed on Feb. 25, 2011, provisional application No. 61/504,146, filed on Jul. 1, 2011.

(58) Field of Classification Search
USPC .................................................. 708/400–410
See application file for complete search history.

(56) References Cited

U.S. PATENT DOCUMENTS

| | | | |
|---|---|---|---|
| 5,029,122 A * | 7/1991 | Uetani | G06F 17/142 |
| | | | 375/E7.226 |
| 5,163,103 A * | 11/1992 | Uetani | G06F 17/142 |
| | | | 358/1.9 |
| 5,257,213 A * | 10/1993 | Kim | G06F 17/147 |
| | | | 708/401 |
| 5,278,646 A | 1/1994 | Civanlar et al. | |
| 5,408,425 A * | 4/1995 | Hou | 708/402 |
| 5,508,949 A | 4/1996 | Konstantinides | |
| 5,649,077 A | 7/1997 | On et al. | |
| 5,712,809 A * | 1/1998 | Girod et al. | 708/402 |
| 5,737,450 A | 4/1998 | Hajjahmad et al. | |
| 5,768,167 A | 6/1998 | Kuroda | |
| 5,959,675 A | 9/1999 | Mita et al. | |
| 6,029,185 A | 2/2000 | Tonomura | |
| 6,252,994 B1 * | 6/2001 | Nafarieh | 382/253 |
| 7,366,236 B1 | 4/2008 | Winger | |
| 7,412,100 B2 | 8/2008 | Raveendran et al. | |
| 7,437,394 B2 | 10/2008 | Hou | |
| 7,725,516 B2 | 5/2010 | Liu | |
| 2001/0054051 A1 | 12/2001 | Tajime | |
| 2002/0106020 A1 | 8/2002 | Cheng et al. | |
| 2003/0076904 A1 * | 4/2003 | Magee | 375/340 |
| 2003/0078952 A1 | 4/2003 | Kim et al. | |
| 2003/0078953 A1 | 4/2003 | Hallapuro et al. | |
| 2003/0093452 A1 | 5/2003 | Zhou | |
| 2003/0105788 A1 | 6/2003 | Chatterjee | |
| 2003/0133507 A1 | 7/2003 | Miro et al. | |
| 2003/0152281 A1 | 8/2003 | Tomita et al. | |
| 2003/0177158 A1 | 9/2003 | Zheltov et al. | |
| 2004/0136602 A1 | 7/2004 | Nagaraj et al. | |
| 2004/0141654 A1 * | 7/2004 | Jeng | 382/238 |
| 2004/0151253 A1 | 8/2004 | Bossen | |
| 2005/0069035 A1 | 3/2005 | Lu et al. | |
| 2005/0141609 A1 | 6/2005 | Malvar | |
| 2005/0213835 A1 | 9/2005 | Guangxi et al. | |
| 2005/0281331 A1 | 12/2005 | Hahm et al. | |
| 2006/0126962 A1 | 6/2006 | Sun | |
| 2006/0165164 A1 | 7/2006 | Kwan et al. | |
| 2007/0025441 A1 | 2/2007 | Ugur et al. | |
| 2007/0156398 A1 * | 7/2007 | Hung | G10L 19/0204 |
| | | | 704/229 |
| 2007/0168410 A1 | 7/2007 | Reznik | |
| 2007/0200738 A1 | 8/2007 | Reznik et al. | |
| 2007/0233764 A1 | 10/2007 | Reznik et al. | |
| 2007/0297503 A1 | 12/2007 | Reznik | |
| 2007/0297504 A1 * | 12/2007 | Reznik | G06F 17/147 |
| | | | 375/240 |
| 2008/0037656 A1 | 2/2008 | Hannuksela | |
| 2008/0049834 A1 * | 2/2008 | Holcomb et al. | 375/240.2 |
| 2009/0080515 A1 | 3/2009 | Nagaraj et al. | |
| 2009/0086816 A1 | 4/2009 | Leontaris et al. | |
| 2009/0141808 A1 | 6/2009 | Wong | |
| 2009/0157785 A1 * | 6/2009 | Reznik et al. | 708/402 |
| 2009/0180700 A1 | 7/2009 | Kim et al. | |
| 2010/0172409 A1 | 7/2010 | Reznik et al. | |
| 2010/0266008 A1 | 10/2010 | Reznik | |
| 2010/0309974 A1 | 12/2010 | Reznik | |
| 2010/0312811 A1 | 12/2010 | Reznik | |
| 2010/0329329 A1 | 12/2010 | Reznik et al. | |
| 2011/0026846 A1 * | 2/2011 | Hsu et al. | 382/250 |
| 2011/0150078 A1 | 6/2011 | Reznik et al. | |
| 2011/0150079 A1 | 6/2011 | Reznik et al. | |
| 2011/0153699 A1 | 6/2011 | Reznik et al. | |
| 2013/0121406 A1 | 5/2013 | Reznik et al. | |
| 2013/0148718 A1 | 6/2013 | Reznik et al. | |

FOREIGN PATENT DOCUMENTS

| | | | |
|---|---|---|---|
| CN | 1455599 A | 11/2003 | |
| CN | 1149499 C | 5/2004 | |
| CN | 1617594 A | 5/2005 | |
| CN | 1791222 A | 6/2006 | |
| CN | 101047849 A | 10/2007 | |
| CN | 101330616 A | 12/2008 | |
| EP | 0917070 A2 | 5/1999 | |
| EP | 1359546 A1 | 11/2003 | |
| JP | H09212484 A | 8/1997 | |
| JP | 2001346213 A | 12/2001 | |
| JP | 2003223433 A | 8/2003 | |
| JP | 2003281115 A | 10/2003 | |
| JP | 2007129731 A | 5/2007 | |
| JP | 2010220225 A | 9/2010 | |
| KR | 1020010043396 | 5/2001 | |
| KR | 100545445 B1 | 1/2006 | |
| KR | 20060112255 A | 10/2006 | |
| TW | 284869 A | 9/1996 | |
| TW | I241074 B | 10/2005 | |
| TW | 200714076 A | 4/2007 | |
| TW | 200727578 | 7/2007 | |
| TW | 200741486 A | 11/2007 | |
| TW | I295455 B | 4/2008 | |
| TW | I310526 B | 6/2009 | |
| WO | 9910818 A1 | 3/1999 | |
| WO | WO 9910818 A1 * | 3/1999 | G06F 17/147 |
| WO | WO0159603 A1 | 8/2001 | |
| WO | 03019787 A2 | 3/2003 | |
| WO | 03019949 A2 | 3/2003 | |
| WO | 2007044598 A2 | 4/2007 | |
| WO | 2007047478 | 4/2007 | |
| WO | 2009039451 A2 | 3/2009 | |
| WO | 2010039822 A2 | 4/2010 | |
| WO | WO2011005583 A2 | 1/2011 | |
| WO | 2012044076 A2 | 4/2012 | |

OTHER PUBLICATIONS

Second Written Opinion of international application No. PCT/US2012/020755, dated Jan. 22, 2014, 8 pp.

Reply to Second Written Opinion dated Jan. 22, 2014, from international application No. PCT/US2012/020755, dated Mar. 20, 2014, 11 pp.

Artieri et al., "A one chip VLSI for real time two-dimensional discrete cosine transform", 1988 IEEE International Symposium on Circuits and Systems, Espoo, Finland, Jun. 7, 1988, pp. 701-704.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," Document No. JCTVC-G1103_d2, 7th Meeting, Geneva, Switzerland, Nov. 21-30, 2011, 214 pp.

Dong et al., "2-D order-16 integer transforms for HD video coding", IEEE Transactions on Circuits and Systems for Video Technology, Oct. 2009, vol. 19, No. 10, pp. 1462-1474

Fuldseth et al., "Transform design for HEVC with 16 bit intermediate data representation," Document No. JCTVC-E243, 5th Meeting, Mar. 16-23, 2011, Geneva, CH, 16 pp.

Fuldseth et al., "Unified transform design for HEVC with 16 bit intermediate data representation," Document No. JCTVC-D224, 4th Meeting, Jan. 20-28, 2011, Daegu, KR, 7 pp.

International Search Report and Written Opinion—PCT/US2012/020755—ISA/EPO—dated Jun. 24, 2013, 24 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

(56) References Cited

OTHER PUBLICATIONS

Joshi et al., "Efficient 16 and 32-point transforms," Document No. JCTVC-D256, 4th Meeting, Jan. 20-28, 2011, Daegu, KR, 8 pp.
Joshi et al., "Efficient large size transforms for high-performance video coding", Applications of Digital Image Processing XXXIII, Sep. 7, 2010, vol. 7798, Proceedings of SPIE, 7 pp.
Joshi et al., "Simplified transforms for extended block sizes," Document No. VCEG-AL30, 38th Meeting, Jul. 6-10, 2009, Geneva, CH, 6 pp.
Joshi et al., "CE10: Scaled orthogonal integer transforms supporting recursive factorization structure," Document No. JCTVC-F352, 6th Meeting, Jul. 14-22, 2011, Torino, IT, 12 pp.
Joshi et al., "CE10: Scaled orthogonal integer transforms supporting recursive factorization structure", Document No. JCTVC-E370, 5th Meeting, Mar. 16-23, 2011, Geneva, CH, 8 pp.
Joshi et al., "Recursive factorization for 16 and 32-point transforms using 4 and 8-point HM 3.0 core transforms", Document No. JCTVC-F592, 6th Meeting, Jul. 14-22, 2011, Torino, IT, 4 pp.
Karczewicz et al., "A hybrid video coder based on extended macroblock sizes, improved interpolation, and flexible motion representation", IEEE Transactions on Circuits and Systems for Video Technology, Dec. 2010, vol. 20, No. 12, pp. 1698-1708.
Karczewicz et al., "Video coding technology proposal by Qualcomm", Document No. JCTVC-A121, 1st Meeting, Apr. 15-23, 2010, Dresden, DE, 25 pp.
Malvar et al., "Low-Complexity Transform and Quantization in H.264/AVC," IEEE Transactions on Circuits and Systems for Video Technology, Jul. 2003, vol. 13, No. 7, pp. 598-603.
Ohm et al., "Special Section on the Joint Call for Proposals on High Efficiency Video Coding (HEVC) Standardization", IEEE Transactions on Circuits and Systems for Video Technology, Dec. 2010, vol. 20, No. 12, pp. 1661-1666.
Reznik et al., "Low-Drift Fixed-Point 8×8 IDCT Approximation with 8-Bit Transform Factors", Image Processing, IEEE International Conference Sep. 2007, pp. VI 81-VI 84.
Reznik et al., "On complexity of size 960 transform in AAC family of codecs", ISO/IEC JTC1/SC29/WG11 M16443, Apr. 2009, Maui, HI, USA, 4 pp.
Sadafale et al., "Low-complexity configurable transform architecture for HEVC," Document No. JCTVC-C226, 3rd Meeting, Guangzhou, CN, Oct. 7-15, 2010, 4 pp.
Wiegand et al., "WD1: Working Draft 1 of High-Efficiency Video Coding", Document No. JCTVC-C403, 3rd Meeting: Guangzhou, CN, Oct. 7-15, 2010, 137 pp.
Wiegand et al., "WD2: Working Draft 2 of High-Efficiency Video Coding," Document No. JCTVC-D503, 4th Meeting, Daegu, KR, Jan. 20-28, 2011, 153 pp.
Wiegand et al., "WD3: Working Draft 3 of High-Efficiency Video Coding," Document JCTVC-E603, 5th Meeting, Geneva, CH, Mar. 16-23, 2011, 193 pp.
International Preliminary Report on Patentability from International application No. PCT/US2012/020755, dated Jul. 10, 2013, 19 pp.
Hong, et al., "Low-complexity 16×16 and 32×32 transforms and partial frequency transform," Document: JCTVC-C209, 3rd Meeting, Oct. 7-15, 2010, 11 pp.
Beaulieu, M. et al., "Multi-Spectral Image Resolution Refinement Using Stationary Wavelet Transform with Marginal and Joint Statistics Modeling," Centre de Recherche Informatique de Montréal, 9 pp.
Britanak et al., "Discrete Cosine and Sine Transforms: General Properties, Fast Algorithms and Integer Approximations," Academic Press, Chapters 2 and 4, 2006, 103 pp.
Loeffler, C. et al. "Practical Fast 1-D DCT Algorithms with 11 Multiplications," IEEE International Conference on Acoustic, Speech, and Signal Processors, vol. 2, May 1989, 4 pp.
Cham, W.K., "Development of integer cosine transforms by the principle of dyadic symmetry," IEE Proceedings, vol. 136, Pt. I, No. 4, Aug. 1989, 7 pp.
Chan, S.C. et al., "Direct methods for computing discrete sinusoidal transforms," IEE Proceedings, vol. 137, Pt. F, No. 6, Dec. 1990, 10 pp.
Chan, S.C. et al., "Fast Algorithms for Computing the Discrete Cosine Transform," IEEE Transactions on Circuits and Systems, vol. 39, No. 3, Mar. 1992, 6 pp.
Chivukula, R., "Fast Algorithms for MDCT and Low Delay Filterbanks Used in Audio Coding," The University of Texas at Arlington, Retrieved from Internet, URL: http://dspace.uta.edu/handle/10106/921, May 2008, 80 pp.
Dai, X. et al., "Fast Algorithm for Modulated Complex Lapped Transform", IEEE Signal Processing Letters, vol. 16, No. 1, Jan. 2009, 4 pp.
Feig, E. et al., "On the Multiplicative Complexity of Discrete Cosine Transforms," IEEE Transactions on Information Theory, vol. 38, No. 4, Jul. 1992, 5 pp.
Feig, E. et al., "Scaled DCT's on Input Sizes that Are Composite", IEEE Transactions on Signal Processing, vol. 43, No. 1, Jan. 1995, 8 pp.
Graps, A., "An Introduction to Wavelets," IEEE Computational Science and Engineering, Summer 1995, vol. 2, No. 2, 18 pp.
Heideman, M., "Computation of an Odd-Length DCT from a Real-Valued DFT of the Same Length," IEEE Transactions on Signal Processing, vol. 40, No. 1, Jan. 1992, 8 pp.
Huang, J. et al., "An Array-based Scalable Architecture for DCT Computations in Video Coding," IEEE International Conference Neural Networks & Signal Processing, Jun. 8-10, 2008, 5 pp.
Liang, J. et al., "Fast Multiplierless Approximations of the DCT with the Lifting Scheme", IEEE Transactions on Signal Processing, vol. 49, No. 12, Dec. 2001, 13 pp.
Kok, C.W., "Fast Algorithm for Computing Discrete Cosine Transform," IEEE Transactions on Signal Processing, vol. 45, No. 3, Mar. 1997, 4 pp.
Loeffler, C., et al., "Algorithm-architecture Mapping for Custom DCT Chips," IEEE International Symposium on Circuits and Systems, Jun. 1988, 4 pp.
Plonka, G. et al., "Fast and numerically stable algorithms for discrete cosine transforms," Linear Algebra and Applications, vol. 394, No. 1, Jan. 2005, 37 pp.
Rao, K. et al., "Discrete Cosine Transform: Algorithms, Advantages Applications," Chapter 4: Fast Algorithms for DCT-II, Academic Press, 1990, 43 pp.
Rao, K. et al., "Discrete Cosine Transform Algorithms, Advantages Applications," Chapter 2: Definitions and General Properties, Academic Press, 1990, pp. 7-25.
Reznik, Y. et al., "Improved Precision of Fixed-Point Algorithms by Means of Common Factors," IEEE International Conference on Image Processing, 2008, 4 pp.
Reznik, Y. et al., "On Design of Transforms for High-Resolution/High-Performance Video Coding." International Organisation for Standardisation, Apr. 2009, 23 pp.
Reznik, Y. et al., "Efficient Fixed-Point Approximations of the 8×8 Inverse Discrete Cosine Transform," Applications of Digital Image Processing, vol. 6696, 2007, 17 pp.
Reznik, Y. et al., "Design of Fast Transforms for High-Resolution Image and Video Coding," Applications of Digital Image Processing, vol. 7443, Sep. 2, 2009, 17 pp.
Reznik, Y. et al., "Fast 15×15 transform for image and video coding applications," IEEE Data Compression Conference, Mar. 16, 2009, 1 pp.
Reznik, Y., "On Fast Algorithm for Computing Even-length DCT", arXiv: 1001.3713v1, Jan. 21, 2010, Retrieved from the Internet, URL: http://arxi v.org/PScache/arxiv/pdf/1001/1001.3713v1.pdf, 13 pp.
Sullivan, G., "Standardization of IDCT approximation behavior for video compression: the history and the new MPEG-C parts 1 and 2 standards," Applications of Digital Image Processing, vol. 6696, 2007, 22 pp.
Li, T. et al., "A Unified Computing Kernel for MDCT/IMDCT in Modern Audio Coding Standards", IEEE Symposium on Communications and Information Technologies, Oct. 17, 2007, 5 pp.

(56) References Cited

OTHER PUBLICATIONS

Xiong, Z. et al., "A Comparative Study of DCT- and Wavelet-Based Image Coding," IEEE Transactions on Circuits and Systems for Video Technology, vol. 9, No. 5, Aug. 1999, 4 pp.
U.S. Appl. No. 12/334,238, by Yuriy Reznik, filed Dec. 12, 2008.
U.S. Appl. No. 12/349,406, by Yuriy Reznik, filed Jan. 6, 2009.
International Preliminary Report on Patentability from International Application No. PCT/US2012/020755, dated Jul. 10, 2013, 19 pages.
Chivukula R. K., et al., "Efficient implementation of a class of MDCT/IMDCT filterbanks for speech and audio coding applications," Acoustics, Speech and Signal Processing, Mar. 31, 2008, pp. 213-216.
Chivukula R. K., et al., "Fast Algorithms for Low-Delay TDAC Filterbanks in MPEG-4 AAC-ELD", IEEE/ACM Transactions on Audio, Speech, and Language Processing, vol. 22, Issue. 12, Dec. 2014, pp. 1701-1712.
Chivukula R. K., et al.,"Efficient algorithms for MPEG-4 AAC-ELD, AAC-LD and AAC-LC Filterbanks" Audio, Language and Image Processing, 2008. ICALIP 2008. International Conference on, IEEE, Piscataway, NJ, USA, Jul. 7, 2008, pp. 1629-1634, XP031298601.
"Research and optimization on block matching motion algorithm based on H.2641AVC", Applications of digital image processin XXXIII, May 2009, pp. 136-198.
Reznik Y. A., et al., "Considerations for choosing precision of MPEG fixed point 8×8 IDCT Standard", International Organisation for Standardisation Organisation Internationale De Normalisation ISO/IEC JTC1/SC29/WG11 Coding of Moving Pictures and Audio,Jan. 2006, Bangkok, Thailand, 5 pages.

Reznik Y. A., et al., "Fixed point multiplication-free 8×8 DCT/IDCT approximation , Nice, France ISO/IEC JTC1/SC29/WG11 M12607," Oct. 2005, 1-37.
Reznik Y. A., et al., "Response to CE on Convergence of scaled and non-scaled IDCT architectures" ISO/IEC JTC1/SC29/WG11 M13650, Jul. 2006 Klagenfurt, Austria, 12 pages.
Reznik Y. A., et al.,"Additional information on IDCT CD candidates and proposed core experiments" ISO/IEC JTC1/SC29/WG11 M14005, Oct. 2006, Hangzhou, China, Oct. 25, 2006 (Oct. 25, 2006), XP030042673.
Reznik Y. A., et al.,"On clipping and dynamic range of variables in IDCT designs". ISO/IEC JTC/SC29 WG11 input document MPEG2006/M14004, Oct. 2006, Hangzhou China, pp. 1-8, XP030042672.
Reznik Y.A. et al., "Low Complexity fixed-point approximation of inverse discrete cosine transform," Proceedings of the 2007 IEEE International Conference on Acoustics, Speech, and Signal Processing, Apr. 15-20, 2007, Honolulu, Hawaii, vol. 1, pp. 1109-1112.
Joshi et al., "Efficient 16 and 32-point transforms," JCT-VC Meeting, Jan. 20-28, 2011; Daegu, KR; Joint Collaborative Team on Video Coding (JCT-VC) of ITU-T SG16 WP3 and ISO/IEC JTC1/SC29/WG11, No. JCTVC-D256, Jan. 22, 2011, 8 pp.
Joshi et al., "CE10: Scaled orthogonal integer transforms supporting recursive factorization structure," JCT-VC Meeting; Mar. 16-23, 2011, Geneva, CH; Joint Collaborative Team on Video Coding (JCT-VC) of ITU-T SG16 WP3 and ISO/IEC JTC1/SC29/WG11, No. JCTVC-E370_r1, Mar. 17, 2011, 12 pp.
Zhao, et al., "Cross Check of Panasonic's Proposal on Modified Motion Vector Compression Method (JCTVC-E231)," Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document: JCTVC-E352, WG11 No. m19880, 2 pp.

\* cited by examiner

32-POINT TRANSFORM FOR MEDIA DATA CODING

This application claims the benefit of U.S. Provisional Application No. 61/431,343, filed Jan. 10, 2011, U.S. Provisional Application No. 61/433,015, filed Jan. 14, 2011, U.S. Provisional Application No. 61/433,351, filed Jan. 17, 2011, U.S. Provisional Application No. 61/446,834, filed Feb. 25, 2011 and U.S. Provisional Application No. 61/504,146, filed Jul. 1, 2011, where the entire contents of each of these U.S. Provisional Applications is incorporated herein by reference.

TECHNICAL FIELD

This disclosure relates to data compression and, more particularly, data compression involving transforms.

BACKGROUND

Data compression is widely used in a variety of applications to reduce consumption of data storage space, transmission bandwidth, or both. Example applications of data compression include visible or audible media data coding, such as digital video, image, speech, and audio coding. Digital video coding, for example, is used in a wide range of devices, including digital televisions, digital direct broadcast systems, wireless communication devices, personal digital assistants (PDAs), laptop or desktop computers, tablet computers, digital cameras, digital recording devices, video gaming devices, cellular or satellite radio telephones, or the like. Digital video devices implement video compression techniques in accordance with standards, such as an MPEG-2 standard, an MPEG-4 standard, an H.264/MPEG-4 Advanced Video Coding (AVC) standard, or the emerging High Efficiency Video Coding (HEVC) standard (which is sometimes referred to as the emerging H.265 standard) to transmit and receive digital video more efficiently.

Video compression techniques may perform spatial prediction, motion estimation and motion compensation to reduce or remove redundancy inherent in video data. In particular, intra-coding relies on spatial prediction to reduce or remove spatial redundancy in video within a given video frame. Inter-coding relies on temporal prediction to reduce or remove temporal redundancy in video within adjacent frames. For inter-coding, a video encoder performs motion estimation to track the movement of matching units (which may be referred to as blocks in various video coding standards, such as the H.264/MPEG-4 AVC standard) between two or more adjacent frames. Motion estimation generates motion vectors, which indicate the displacement of units of a current frame relative to corresponding units in one or more reference frames. Motion compensation uses the motion vector to generate prediction data from a reference frame. After motion compensation, residual data is formed by subtracting the prediction data from the original unit.

A video encoder then applies a transform followed by quantization and lossless statistical coding processes to further reduce the bit rate of the residual data produced by the video coding process. In some instances, the applied transform comprises a discrete cosine transform (DCT). Typically, the DCT is applied to coding units whose size is a power of two, such as a coding unit that is 16 pixels high by 16 pixels wide (which is often referred to as a "16×16 unit"). These DCTs may, therefore, be referred to as 16-point DCTs in that these DCTs are applied to 16×16 units to produce a 16-point array of DCT coefficients. The 16-point array of DCT coefficients produced from applying a 16-point DCT to the residual data then undergo quantization and lossless statistical coding processes (commonly known as "entropy coding" processes) to generate a bitstream. Examples of statistical coding processes include context-adaptive variable length coding (CAVLC) or context-adaptive binary arithmetic coding (CABAC). A video decoder receives the encoded bitstream and performs lossless decoding to decompress the DCT coefficients, which the video decoder then transforms back into the spatial domain through application of one or more 16-point inverse DCTs (IDCT) to form residual data for each of the units. Using the residual data and motion information, the video decoder reconstructs the encoded video.

SUMMARY

In general, this disclosure is directed to techniques for coding data, such as media data, using an implementation of a 32-point discrete cosine transform (DCT) capable not only of performing a 32-point DCT but multiple different DCTs of different sizes. As one example, the 32-point DCT implementation constructed in accordance with the techniques of this disclosure performs a DCT of size 32 and includes a scaled 16-point DCT implementation that performs a DCT of size 16 and at least one DCT implementation that performs a DCT of size 8. In another example, the 32-point DCT implementation constructed in accordance with the techniques of this disclosure performs a linear DCT of size 32 and includes a 16-point DCT that performs a DCT of size 16, where this 16-point DCT further performs at least one 8-point DCT implementation that itself performs a linear DCT of size 8 and at least two 4-point DCT implementations that each perform a linear DCT of size 4, which may operate concurrently with one another. Moreover, the 8-point DCT implementation may include yet another 4-point DCT implementation that performs another linear DCT of size 4, which may operate concurrently with the 4-point DCTs performed by the at least two 4-point DCT implementations. This 32-point DCT may also include two 8-point DCTs that are capable of concurrently performing two DCTs of size 8. Consequently, the 32-point DCT implementation constructed in accordance with the techniques of this disclosure may incorporate a number of different DCT implementations of varying sizes, which may consume significantly less chip-area in comparison to the chip-area conventionally consumed by each of these DCTs when separately implemented.

These DCTs may be applied to a video unit of any given size by first applying one of these DCTs in one direction along the unit, such as along the horizontal axis, and then applied in the other direction along the unit, such as along the vertical axis. By applying these DCTs in this manner DCTs of varying sizes may be applied. For example, a 32-point DCT may be applied in one direction and a 16-point DCT may be applied in another direction to effectively apply a 32×16 or 16×32 DCT depending on the size of the underlying unit. In this way, the DCTs may be applied to perform DCTs of size 32×32, 32×16, 16×32, 16×16, 16×8, 8×16, 8×8, 8×4, 4×8, 4×4 or any other combination of the foregoing linear sized DCTs.

In one aspect, a method for transforming content data from a spatial domain to a frequency domain, the method comprises performing one or more of multiple scaled transforms of different sizes with a scaled 32-point transform unit to transform the content data from the spatial domain to the frequency domain, wherein the scaled 32-point transform unit performs a first one of the plurality of scaled transform of size 32. The scaled 32-point transform unit includes a scaled 16-point transform unit located in an even half of the 32-point transform unit that performs a second one of the plurality of scaled transforms, the second one of the plurality of scaled transforms defining a transform size of 16 and at least one scaled 8-point transform unit located in the odd half of the 32-point transform unit that performs a third one of the plurality of scaled transform, the third one of the plurality of scaled transforms defining a transform size of 8.

In another aspect, an apparatus comprises means for performing a plurality of scaled transforms of different sizes to transform content data from a spatial domain to a frequency domain, wherein the means for performing the plurality of scaled transform of different sizes performs a first one of the plurality of scaled transforms, the first one of the plurality of scaled transforms defining a transform size of 32. The means for performing the plurality of scaled transforms of different sizes includes means located in an even half of the means for performing the plurality of scaled transforms for performing a second one of the plurality of scaled transforms, the second one of the plurality of scaled transforms defining a transform size of 16 and means located in an odd half of the means for performing the plurality of scaled transforms for performing a third one of the plurality of scaled transform, the third one of the plurality of scaled transforms defining a transform size of 8.

In another aspect, an apparatus comprises a scaled 32-point transform unit that performs a plurality of scaled transforms of different sizes to transform content data from a spatial domain to a frequency domain, wherein the scaled 32-point transform unit performs a first one of the plurality of scaled transforms, the first one of the plurality of scaled transforms defining a transform size of 32. The 32-point transform unit includes a scaled 16-point transform unit located in an even half of the 32-point transform unit that performs a second one of the plurality of scaled transforms, the second one of the plurality of scaled transforms defining a transform size of 16 and at least one scaled 8-point transform unit located in the odd half of the 32-point transform unit that performs a third one of the plurality of scaled transform, the third one of the plurality of scaled transforms defining a transform size of 8.

In another aspect, a non-transitory computer-readable medium comprising instructions that, when executed, cause one or more processor to implement a 32-point transform unit that performs one or more of multiple scaled transforms of different sizes to transform content data from a spatial domain to a frequency domain, wherein the scaled 32-point transform unit performs a first one of the plurality of scaled transform of size 32. The scaled 32-point transform unit includes a scaled 16-point transform unit located in an even half of the 32-point transform unit that performs a second one of the plurality of scaled transforms, the second one of the plurality of scaled transforms defining a transform size of 16 and at least one scaled 8-point transform unit located in the odd half of the 32-point transform unit that performs a third one of the plurality of scaled transform, the third one of the plurality of scaled transforms defining a transform size of 8.

In another aspect, a method for transforming transformed content data from a frequency domain to a spatial domain, the method comprises performing one or more of multiple scaled transforms of different sizes with a scaled 32-point transform unit to transform the transformed content data from the frequency domain to the spatial domain, wherein the scaled 32-point transform unit performs a first one of the plurality of scaled transform of size 32. The scaled 32-point transform unit includes a scaled 16-point transform unit located in an even half of the 32-point transform unit that performs a second one of the plurality of scaled transforms, the second one of the plurality of scaled transforms defining a transform size of 16 and at least one scaled 8-point transform unit located in the odd half of the 32-point transform unit that performs a third one of the plurality of scaled transform, the third one of the plurality of scaled transforms defining a transform size of 8.

In another aspect, an apparatus comprises means for performing a plurality of scaled transforms of different sizes to transform content data from a frequency domain to a spatial domain, wherein the means for performing the plurality of scaled transform of different sizes performs a first one of the plurality of scaled transforms, the first one of the plurality of scaled transforms defining a transform size of 32. The means for performing the plurality of scaled transforms of different sizes includes means located in an even half of the means for performing the plurality of scaled transforms for performing a second one of the plurality of scaled transforms, the second one of the plurality of scaled transforms defining a transform size of 16 and means located in an odd half of the means for performing the plurality of scaled transforms for performing a third one of the plurality of scaled transform, the third one of the plurality of scaled transforms defining a transform size of 8.

In another aspect, an apparatus comprises a scaled 32-point transform unit that performs a plurality of scaled transforms of different sizes to transform content data from a frequency domain to a spatial domain, wherein the scaled 32-point transform unit performs a first one of the plurality of scaled transforms, the first one of the plurality of scaled transforms defining a transform size of 32. The scaled 32-point transform unit includes a scaled 16-point transform unit located in an even half of the 32-point transform unit that performs a second one of the plurality of scaled transforms, the second one of the plurality of scaled transforms defining a transform size of 16 and at least one scaled 8-point transform unit located in the odd half of the 32-point transform unit that performs a third one of the plurality of scaled transform, the third one of the plurality of scaled transforms defining a transform size of 8.

In another aspect, a non-transitory computer-readable medium comprises instructions that, when executed, cause one or more processor to implement a 32-point transform unit that performs one or more of multiple scaled transforms of different sizes to transform content data from a frequency domain to a spatial domain, wherein the scaled 32-point transform unit performs a first one of the plurality of scaled transform of size 32. The scaled 32-point transform unit includes a scaled 16-point transform unit located in an even half of the 32-point transform unit that performs a second one of the plurality of scaled transforms, the second one of the plurality of scaled transforms defining a transform size of 16 and at least one scaled 8-point transform unit located in the odd half of the 32-point transform unit that performs a third one of the plurality of scaled transform, the third one of the plurality of scaled transforms defining a transform size of 8.

The details of one or more aspects of the techniques are set forth in the accompanying drawings and the description below. Other features, objects, and advantages of the techniques described in this disclosure will be apparent from the description and drawings, and from the claims.

DETAILED DESCRIPTION

Figure 1:
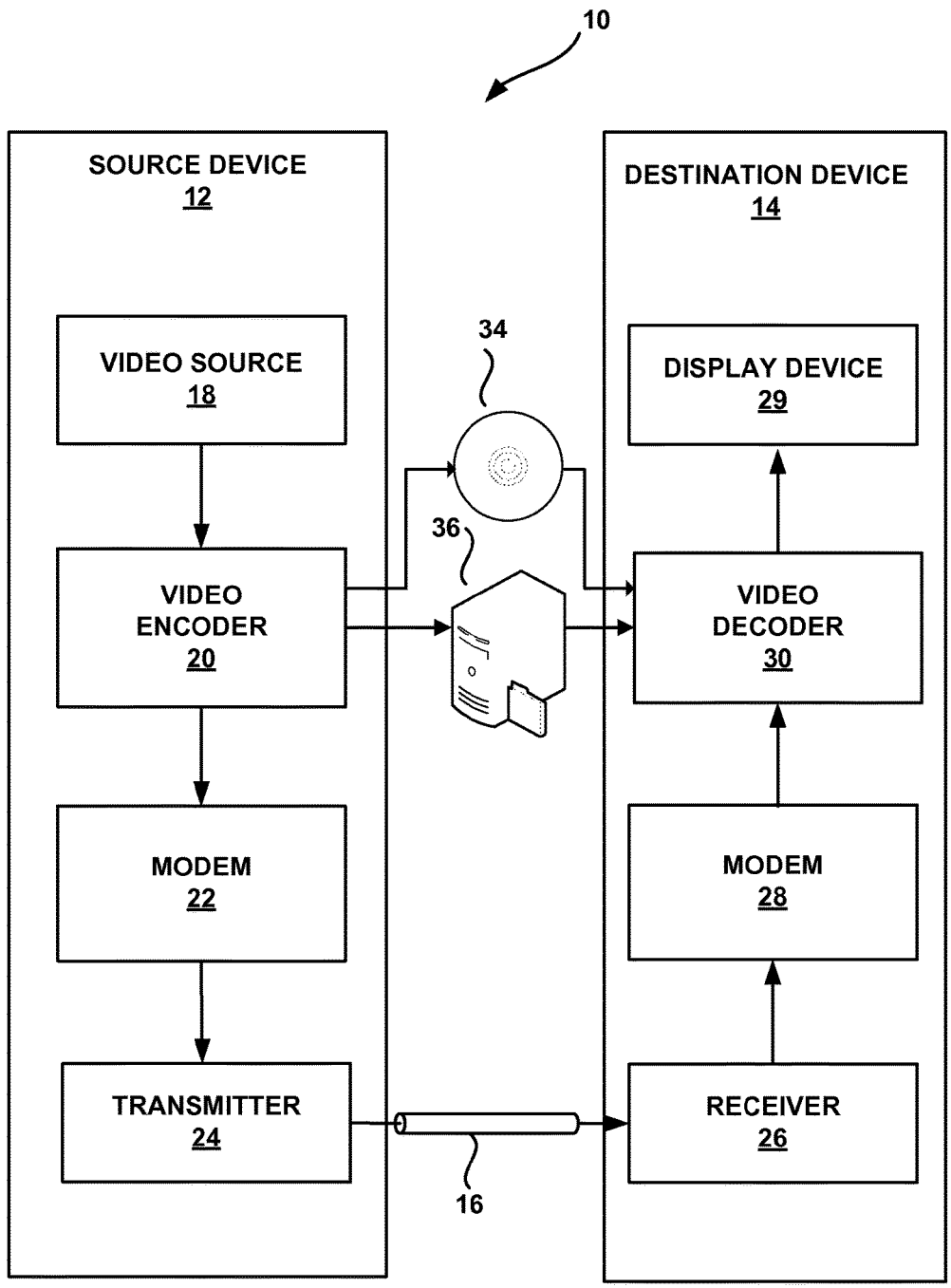
FIG. 1 is a block diagram illustrating a video encoding and decoding system that may implement techniques of this disclosure.

In general, this disclosure is directed to techniques for coding data using a 32-point discrete cosine transforms (DCTs) implementation that includes a number of different DCT implementations capable of performing a number of different DCTs of different sizes. The techniques may be applied to compress a variety of data, including visible media data or audible media data, such as digital video data, image data, speech data, and/or audio data, and thereby transform such electrical signals representing such data into compressed signals for more efficient processing, transmission or archival of the electrical signals. The 32-point DCT implementation constructed in accordance with the techniques of this disclosure is, therefore, capable of performing DCTs of multiple sizes. By performing DCTs of multiple sizes, the 32-point DCT implementation potentially eliminates separate DCT implementations to perform the DCTs of similar sizes. Consequently, the described techniques may promote reduced consumption of so-called "board space," as the 32-point DCT implementation constructed in accordance with the techniques of this disclosure incorporates, nests or otherwise embeds DCT implementations of different sizes, such as 16, 8 and 4, without substantially increasing the size of the 32-point implementation in comparison to the total size of separate 32-point, 16-point, 8-point and 4-point DCT implementations. Consuming less board space generally translates into a reduction of power consumption and, as a result, the techniques of this disclosure may promote more energy efficient DCT implementations.

The sizes denoted above, i.e., 32, 16, 8 and 4, are represented in terms of discrete data units. To illustrate, video data is often described in terms of unit (such as the coding units (CUs) set forth in the HEVC standard), particularly with respect to video compression. A unit generally refers to any sized portion of a video frame, where a video frame refers to a picture or image in a series of pictures or images. Each unit typically comprises a plurality of discrete pixel data that indicates either color components, e.g., red, blue and green, (so-called "chromaticity" or "chroma" components) or luminance components (so-called "luma" components). Each set of pixel data comprises a single pixel in the unit and may be considered a discrete data unit with respect to a coding unit. Thus, an 8×8 coding unit, for example, comprises eight rows of pixel data with eight discrete sets of pixel data in each row. An n-bit value may be assigned to each pixel to specify a color or luminance value.

DCTs are commonly described in terms of the size of the block of data, whether audio, speech image or video data, the DCT is capable of processing. For example, if a DCT can process a 32 element array of data, the DCT may be referred to as a linear 32-point DCT. Linear DCTs of same or different sizes may be applied to effectively perform 32×32, 32×16, 16×32, 16×8, 8×16, 8×8, 8×4, 4×8, 4×4 or any other combination of sizes to different sized coding units. Moreover, DCTs may be denoted as a particular type. The most commonly employed type of DCT of the eight different types of DCTs is a DCT of type-II, which may be denoted as "DCT-II." Often, when referring generally to a DCT, such reference refers to a DCT of type-II or DCT-II. The inverse of a DCT-II is referred to as a DCT of type-III, which similarly may be denoted as "DCT-III" or, with the common understanding that DCT refers to a DCT-II, as "IDCT" where the "I" in "IDCT" denotes inverse. Reference to DCTs below conforms to this notation, where general reference to DCTs refers to a DCT-II unless otherwise specified. However, to avoid confusion, DCTs, including DCTs-II, are referred to below with the corresponding type (II, III, etc.) indicated.

The techniques described in this disclosure may be implemented in an encoder and/or decoder that employ one or more implementations of the 32-point DCTs-II and/or 32-point DCTs-III to facilitate compression and/or decompression of data. Again, the compression and decompression accomplished by applying these 32-point DCT-II implementations permits physical transformation of electrical signals representing the data such that the signals can be processed, transmitted, and/or stored more efficiently using physical computing hardware, physical transmission media (e.g., copper, optical fiber, wireless, or other media), and/or storage hardware (e.g., magnetic or optical disk or tape, or any of a variety of solid state media). The implementations may be configured solely in hardware or may be configured in a combination of hardware and software.

The implementations of the 32-point DCTs-II may be scaled, where the term "scaled" refers to a DCT implementation that produces scaled DCT coefficients. Scaled DCT coefficients, when multiplied by corresponding scale factors produce the so-called "full" DCT coefficients. A scaled DCT implementation represents a DCT implementation having certain factors removed from the implementation. Generally, these factors are incorporated into another element, module, or unit of a given coding device or system. For example, a video encoder may include a scaled 16-point DCT implementation constructed in accordance with the techniques of this disclosure. The video encoder generally incorporates the removed factors into a quantization unit, which quantizes the scaled DCT coefficients output by the scaled 32-point DCT implementation. The quantization unit may generally apply these factors without substantially increasing the complexity of the quantization unit, while a full DCT implementation that applies these factors is generally more complex than a scaled DCT implementation in combination with another module or unit that applies the factors, such as the quantization unit. Consequently, scaled DCT implementations, in certain contexts, may provide for reduced implementation complexity while providing the same coding gain. While described in this disclosure with respect to scaled DCT implementations, the techniques may be applied to non-scaled or so-called "full" DCT implementations.

To illustrate, an apparatus may include the 32-point DCT implementation constructed in accordance with the techniques of this disclosure in the form of a 32-point DCT transform unit. The 32-point DCT transform unit may perform a number of scaled DCT transforms of different sizes to transform content data from a spatial domain to a frequency domain. The scaled 32-point DCT unit may include at least one scaled 16-point DCT unit that performs a first one of the number of scaled DCT transforms of size 16. The 16-point DCT unit may also include at least one scaled 8-point transform unit that performs at least a second one of the number of scaled DCT transforms of size 8, as well as, at least one scaled 4-point transform unit that performs at least a third one of the number of scaled DCT transforms of size 4. The scaled 32-point DCT unit may also include at least one 8-point transform unit that performs at least a fourth one of the number of scaled DCT transforms of size 8.

In this respect, the 32-point DCT implementation constructed in accordance with the techniques of this disclosure may be capable, at least in some aspects, of performing DCTs of multiple sizes, thereby potentially eliminating separate DCT implementations to perform the DCTs of the multiple sizes. Consequently, the techniques of this disclosure promote reduced consumption of so-called "board space," as the 32-point DCT implementation constructed in accordance with the techniques incorporates, nests or otherwise embeds DCT implementations of different sizes, such as 16, 8 and 4, without substantially increasing the size of the 32-point implementation. In comparison to the total size of separate 32-point, 16-point, 8-point and 4-point DCT implementations, the 32-point DCT-II implementation of this disclosure may be substantially smaller in terms of physical board space consumed, where the term "board space" refers to an amount of space consumed on a silicon or other physical board that provides interconnections between different components. Consuming less board space generally translates into a reduction of power consumption and, as a result, the techniques of this disclosure may promote more energy efficient DCT implementations.

FIG. 1 is a block diagram illustrating a video encoding and decoding system 10 that may implement techniques of this disclosure. As shown in the example of FIG. 1, system 10 includes a source device 12 that generates encoded video for decoding by destination device 14. Source device 12 may transmit the encoded video to destination device 14 via communication channel 16 or may store the encoded video on a storage medium 34 or a file server 36, such that the encoded video may be accessed by the destination device 14 as desired. Source device 12 and destination device 14 may comprise any of a wide variety of devices, including desktop computers, notebook (i.e., laptop) computers, tablet computers, set-top boxes, telephone handsets (including cellular telephones or handsets and so-called smartphones), televisions, cameras, display devices, digital media players, video gaming consoles, or the like.

In many cases, such devices may be equipped for wireless communication. Hence, communication channel 16 may comprise a wireless channel. Alternatively, communication channel 16 may comprise a wired channel, a combination of wireless and wired channels or any other type of communication channel or combination of communication channels suitable for transmission of encoded video data, such as a radio frequency (RF) spectrum or one or more physical transmission lines. In some examples, communication channel 16 may form part of a packet-based network, such as a local area network (LAN), a wide-area network (WAN), or a global network such as the Internet. Communication channel 16, therefore, generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

As further shown in the example of FIG. 1, source device 12 includes a video source 18, video encoder 20, a modulator/demodulator 22 ("modem 22") and a transmitter 24. In source device 12, video source 18 may include a source such as a video capture device. The video capture device, by way of example, may include one or more of a video camera, a video archive containing previously captured video, a video feed interface to receive video from a video content provider, and/or a computer graphics system for generating computer graphics data as the source video. As one example, if video source 18 is a video camera, source device 12 and destination device 14 may form so-called camera phones or video phones. The techniques described in this disclosure, however, are not limited to wireless applications or settings, and may be applied to non-wireless devices including video encoding and/or decoding capabilities. Source device 12 and destination device 16 are, therefore, merely examples of coding devices that can support the techniques described herein.

Video encoder 20 may encode the captured, pre-captured, or computer-generated video. Once encoded, video encoder 20 may output this encoded video to modem 22. Modem 22 may then modulate the encoded video according to a communication standard, such as a wireless communication protocol, whereupon transmitter 24 may transmit the modulated encoded video data to destination device 14. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later retrieval, decoding and consumption. The storage medium 34 may include Blu-ray discs, DVDs, CD-ROMs, flash memory, or any other suitable digital storage media for storing encoded video. Destination device 14 may access the encoded video stored on the storage medium 34 or the file server 36, decode this encoded video to generate decoded video and playback this decoded video.

File server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. Destination device 14 may access file server 36 in accordance with any standard data connection, including an Internet connection. This connection may include a wireless channel (e.g., a Wi-Fi connection or wireless cellular data connection), a wired connection (e.g., DSL, cable modem, etc.), a combination of both wired and wireless channels or any other type of communication channel suitable for accessing encoded video data stored on a file server.

Destination device 14, in the example of FIG. 1, includes a receiver 26, a modem 28, a video decoder 30, and a display device 29. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding the associated encoded video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 29 of destination device 14 represents any type of display capable of presenting video data for consumption by a viewer. Although shown as integrated with destination device 14, display device 29 may be integrated with, or external to, destination device 14. In some examples, destination device 14 may include an integrated display device and also be configured to interface with an external display device. In other examples, destination device 14 may be a display device. In general, display device 29 displays the decoded video data to a user, and may comprise any of a variety of display devices such as a liquid crystal display (LCD), a plasma display, an organic light emitting diode (OLED) display, or another type of display device.

This disclosure may generally refer to video encoder 20 "signaling" the syntax information to another device, such as video decoder 30. It should be understood, however, that video encoder 20 may signal information by associating the syntax elements with various encoded portions of video data. That is, video encoder 20 may "signal" data by storing certain syntax elements to headers of various encoded portions of video data. In some cases, such syntax elements may be encoded and stored (e.g., stored to storage medium 34 or file server 36) prior to being received and decoded by video decoder 30. Thus, the term "signaling" may generally refer to the communication of syntax or other data used to decode the compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

HM refers to a block of video data as a coding unit (CU). In general, a CU has a similar purpose to a macroblock coded according to H.264, except that a CU does not have the size distinction associated with the macroblocks of H.264. Thus, a CU may be split into sub-CUs. In general, references in this disclosure to a CU may refer to a largest coding unit (LCU) of a picture or a sub-CU of an LCU. For example, syntax data within a bitstream may define the LCU, which is a largest coding unit in terms of the number of pixels. An LCU may be split into sub-CUs, and each sub-CU may be split into sub-CUs. Syntax data for a bitstream may define a maximum number of times an LCU may be split, referred to as a maximum CU depth. Accordingly, a bitstream may also define a smallest coding unit (SCU).

An LCU may be associated with a hierarchical quadtree data structure. In general, a quadtree data structure includes one node per CU, where a root node corresponds to the LCU. If a CU is split into four sub-CUs, the node corresponding to the CU includes a reference for each of four nodes that correspond to the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining one or more motion vectors for the PU. A motion vector generally identifies a co-located CU in one or more reference frames, where the term "reference frame" refers a frame that occurs temporally before or after the frame in which the PU is located. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, a prediction direction that identifies whether the identified reference frame is before or after the current frame, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

In addition to having one or more PUs that define one or more motion vectors, a CU may include one or more transform units (TUs). Following prediction using a PU, a video encoder may calculate a residual value for the portion of the CU corresponding to the PU. The residual value may be transformed, quantized, and scanned. A TU is not necessarily limited to the size of a PU. Thus, TUs may be larger or smaller than corresponding PUs for the same CU. In some examples, the maximum size of a TU may be the size of the corresponding CU. This disclosure also uses the term "block" to refer to any one or combination of a CU, PU, and/or TU.

In general, encoded video data may include prediction data and residual data. Video encoder 20 may produce the prediction data during an intra-prediction mode or an inter-prediction mode. Intra-prediction generally involves predicting the pixel values in a block of a picture relative to reference samples in neighboring, previously coded blocks of the same picture. Inter-prediction generally involves predicting the pixel values in a block of a picture relative to data of a previously coded picture.

Following intra- or inter-prediction, video encoder 20 may calculate residual pixel values for the block. The residual values generally correspond to differences between the predicted pixel value data for the block and the true pixel value data of the block. For example, the residual values may include pixel difference values indicating differences between coded pixels and predictive pixels. In some examples, the coded pixels may be associated with a block of pixels to be coded, and the predictive pixels may be associated with one or more blocks of pixels used to predict the coded block.

To further compress the residual value of a block, the residual value may be transformed into a set of transform coefficients that compact as much data (also referred to as "energy") as possible into as few coefficients as possible. Transform techniques may comprise a discrete cosine transform (DCT) process or conceptually similar process, integer transforms, wavelet transforms, or other types of transforms. The transform converts the residual values of the pixels from the spatial domain to a transform domain. The transform coefficients correspond to a two-dimensional matrix of coefficients that is ordinarily the same size as the original block. In other words, there are just as many transform coefficients as pixels in the original block. However, due to the transform, many of the transform coefficients may have values equal to zero.

Video encoder 20 may then quantize the transform coefficients to further compress the video data. Quantization generally involves mapping values within a relatively large range to values in a relatively small range, thus reducing the amount of data needed to represent the quantized transform coefficients. More specifically, quantization may be applied according to a quantization parameter (QP), which may be defined at the LCU level. Accordingly, the same level of quantization may be applied to all transform coefficients in the TUs associated with different PUs of CUs within an LCU. However, rather than signal the QP itself, a change (i.e., a delta) in the QP may be signaled with the LCU. The delta QP defines a change in the quantization parameter for the LCU relative to some reference QP, such as the QP of a previously communicated LCU.

Following quantization, video encoder 20 may scan the transform coefficients, producing a one-dimensional vector from the two-dimensional matrix including the quantized transform coefficients. Video encoder 20 may then perform statistical lossless encoding (which is commonly referred to by the misnomer "entropy encoding") to encode the resulting array to even further compress the data. In general, entropy coding comprises one or more processes that collectively compress a sequence of quantized transform coefficients and/or other syntax information. For example, syntax elements, such as the delta QPs, prediction vectors, coding modes, filters, offsets, or other information, may also be included in the entropy coded bitstream. The scanned coefficients are then entropy coded along with any syntax information, e.g., via content adaptive variable length coding (CAVLC), context adaptive binary arithmetic coding (CABAC), or any other statistical lossless coding process.

As noted above, video encoder 20 and/or video decoder 30 of system 10 shown in the example of FIG. 1 may be configured to include an implementation of a 32-point DCT-II and an inverse thereof (e.g., a 32-point DCT-III), respectively, wherein the 32-point DCT-II implementation is constructed in accordance with the techniques described in this disclosure. While ITU-T H.264 standard supports intra prediction in various block sizes, such as 16×16, 8×8, 4×4 for luma components, and 8×8 for chroma components, revisions to this standard to improve coding efficiency are currently underway. One revised standard proposed by the Joint Collaborative Team-Video Coding (JCT-VC), which is a collaboration between MPEG and ITU-T, may be referred to as High Efficiency Video Coding (HEVC). In some instances, 32-point DCTs of type-II ("DCTs-II") implementations constructed in accordance with the techniques of this disclosure may preserve coding efficiency while also reducing implementation sizes, thereby consuming less physical board space and promoting power efficiency. Consequently, HEVC and other evolving standards or specifications may consider the DCTs-II and DCTs-III implementations that conform to the techniques described in this disclosure.

In accordance with the techniques described in this disclosure, implementations of 32-point DCTs-II provide a plurality of DCTs-II of different sizes. Video encoder 20 may include a 32-point DCT-II unit (which is not shown in FIG. 1 for ease of illustration purposes) that represents this 32-point DCT-II implementation. The 32-point DCT-II unit generally performs a plurality or number of scaled DCT transforms of different sizes to transform content data from a spatial domain to a frequency domain. As one example, the 32-point DCT-II unit may include a scaled 16-point transform unit located in an even half of the 32-point transform unit that performs one of the scaled transforms, where the second one of the plurality of scaled transforms defines a transform size of 16. The 32-point DCT-II unit may also include at least one scaled 8-point transform unit located in the odd half of the 32-point transform unit that performs a third one of the plurality of scaled transform, where this one of the scaled transforms defines a transform size of 8.

In this respect, a single 32-point DCT-II implementation constructed in accordance with the techniques of this disclosure is capable, at least in some aspects, of performing DCTs of multiple sizes, thereby potentially eliminating separate DCT implementations to perform the DCTs of similar sizes. Accordingly, the techniques of this disclosure may promote reduced consumption of so-called "board space," which refers to the area of physical space consumed on a silicon board, as the 32-point DCT implementation constructed in accordance with the techniques incorporates, nests or otherwise embeds DCT implementations of different sizes, such as 16 and 8, without substantially increasing the size of the 32-point implementation. In comparison to the total size of separate 32-, 16- and 8-point DCT implementations, the 32-point DCT-II implementation may be substantially smaller in terms of physical board space consumed. Consuming less board space generally translates into a reduction of power consumption and, as a result, the techniques of this disclosure may promote more energy efficient DCT implementations.

The implementations of the 32-point DCTs-II constructed in accordance with the techniques of this disclosure may be scaled, where the term "scaled" refers to a DCT implementation that produces scaled DCT coefficients, not so-called "full" DCT coefficients. A scaled DCT implementation represents a DCT implementation having certain factors removed from the implementation. Generally, these removed factors are incorporated into another element, module, or unit of a given coding device or system. For example, a video encoder may include a scaled 32-point DCT implementation constructed in accordance with the techniques of this disclosure. The video encoder generally incorporate the removed factors into a quantization unit, which quantizes the scaled DCT coefficients output by the scaled 32-point DCT implementation. The quantization unit may generally apply these factors without substantially increasing the complexity of the quantization unit while a full DCT implementation that applies these factors is generally more complex than a scaled DCT implementation in combination with another unit that applies the factors, such as the quantization unit. Consequently, scaled DCT implementations, in certain contexts, may provide for reduced implementation complexity while providing the same coding gain. While described in this disclosure with respect to scaled DCT implementations, the techniques may be applied to non-scaled or so-called "full" DCT implementations.

Figure 2:
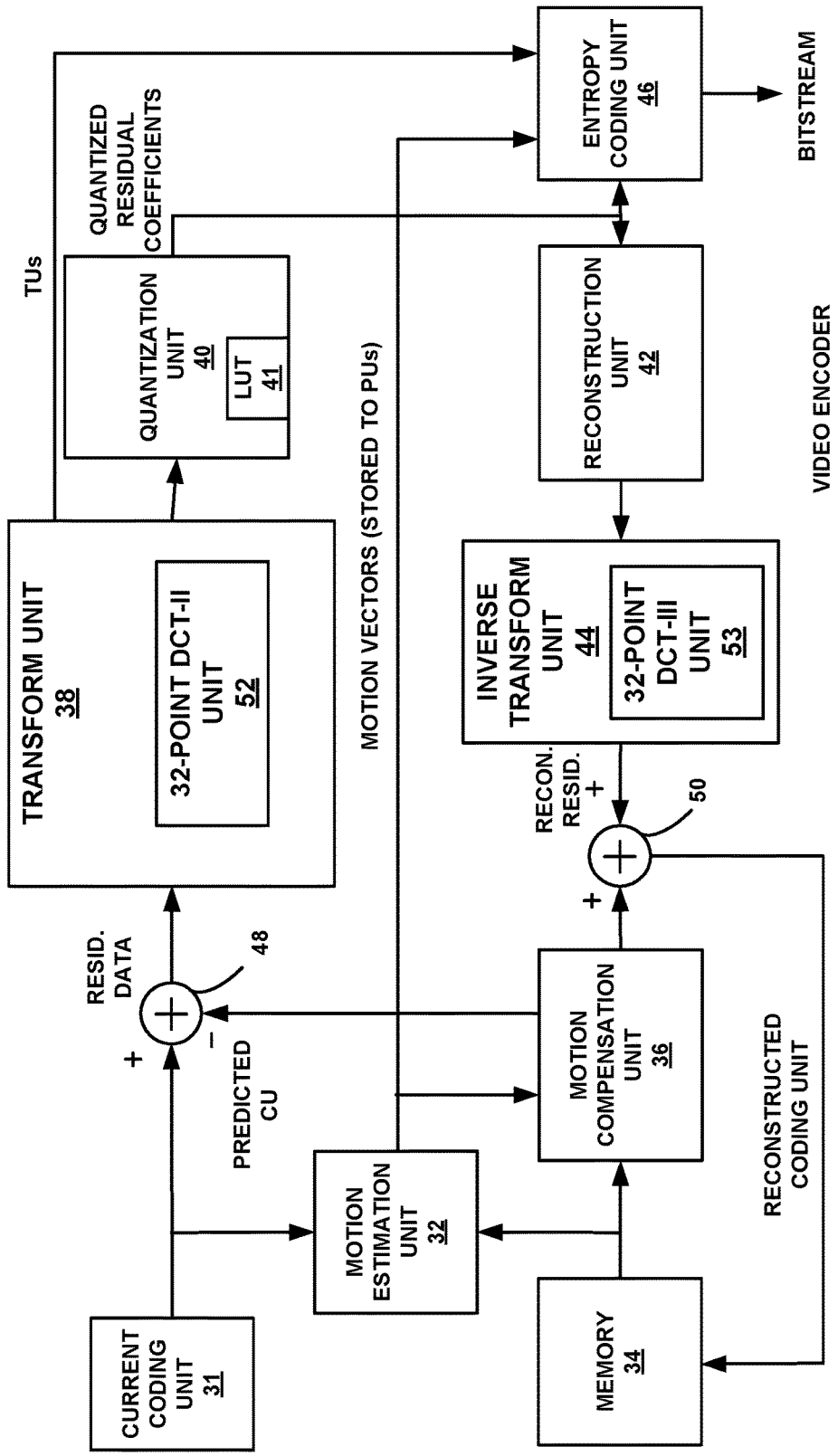
FIG. 2 is a block diagram illustrating the video encoder of FIG. 1 in more detail.

FIG. 2 is a block diagram illustrating video encoder 20 of FIG. 1 in more detail. Video encoder 20 may be formed at least in part as one or more integrated circuit devices, which may be referred to collectively as an integrated circuit device. In some aspects, video encoder 20 may form part of a wireless communication device handset or broadcast server. Video encoder 20 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 20 performs motion estimation to track the movement of matching coding units between adjacent frames.

As shown in FIG. 2, video encoder 20 receives a current coding unit 31 within a video frame to be encoded. In the example of FIG. 2, video encoder 20 includes motion estimation unit 32, memory 34, motion compensation unit 36, transform unit 38, quantization unit 40, inverse quantization unit 42, inverse transform unit 44 and entropy coding unit 46. An in-loop or post loop deblocking filter (not shown) may be applied to filter blocks to remove blocking artifacts. Video encoder 20 also includes summer 48 and summer 50. FIG. 2 illustrates the temporal prediction components of video encoder 20 for inter-coding of coding units. Although not shown in FIG. 2 for ease of illustration, video encoder 20 also may include spatial prediction components for intra-coding of some coding units.

Motion estimation unit 32 compares coding unit 31 to CUs in one or more adjacent video frames to generate one or more motion vectors, which are stored to PUs, as noted above. The adjacent frame or frames may be retrieved from memory 34, which may comprise any type of memory or data storage device to store coding units reconstructed from previously encoded blocks. Motion estimation may be performed for CUs of variable sizes, e.g., 32×32, 32×16, 16×32, 16×16, 16×8, 8×16, 8×8 or smaller CU sizes. Motion estimation unit 32 identifies one or more CUs in adjacent frames that most closely matches the current coding unit 31, e.g., based on a rate distortion model, and determines displacement between the CUs in adjacent frames and current coding unit 31. On this basis, motion estimation unit 32 produces one or more motion vectors (MVs) that indicate the magnitude and trajectory of the displacement between current coding unit 31 and one or more matching CUs from the reference frames used to code current coding unit 31. The matching CU or CUs will serve as a reference for determining the motion vectors stored to PUs associated with coding unit 31. Motion estimation unit 32 may output these PUs to entropy coding unit 46, as shown in the example of FIG. 2.

Motion vectors may have half- or quarter-pixel precision, or even finer precision, allowing video encoder 20 to track motion with higher precision than integer pixel locations and obtain a better prediction block. When motion vectors with fractional pixel values are used, interpolation operations are carried out in motion compensation unit 36. Motion estimation unit 32 determines the best coding unit partitions and generates a motion vector or motion vectors to identify a CU using certain criteria, such as a rate-distortion model. For example, there may be more than one motion vector in the case of bi-directional prediction. Using the resulting CU and motion vectors, motion compensation unit 36 forms a predicted video data.

Video encoder 20 determines residual data by subtracting at summer 48 the predicted video data produced by motion compensation unit 36 from the original video data stored to current coding unit 31. Transform unit 38 applies a transform producing residual transform block coefficients. As shown in FIG. 2, transform unit 38 includes a 32-point DCT-II unit 52 that implements a 32-point DCT-II constructed in accordance with the techniques described in this disclosure. 32-point DCT-II unit 52 represents a hardware unit, which in some instances executes software (such as a digital signal processor or DSP executing software code or instructions), that implements a 32-point DCT-II capable of performing two or more of a 32-point DCT-II, a 16-point DCT-II, 8-point DCT-II and a 4-point DCT-II, as described in this disclosure. 32-point DCT-II unit 52 may comprise an integrated circuit that performs the techniques and/or one or more processors that execute instructions (or software in the form of a computer-program product) to implement the techniques described in this disclosure. 32-point DCT-II unit 52 applies one of more of these DCTs-II of size 32, 16, 8 and 4 to the residual data to produce a block of residual transform coefficients of a corresponding size 16, 8 and/or 4. 32-point DCT-II unit 52 generally transforms the residual data from the spatial domain, which is represented as residual pixel data, to the frequency domain, which is represented as DCT coefficients. The transform coefficients may comprise DCT coefficients that include at least one DC coefficient and one or more AC coefficients.

In the emerging HEVC standard (which may refer to one of various working drafts for HEVC), transforms may be applied to block sizes larger than 16×16, which was the largest block size in the previous video coding standard, H.264. Moreover, transforms of sizes different from the size of the CU may be applied to the residual data stored to the CU at this stage of the video coding process. Given that transforms may be applied of sizes different than the size of the residual video data or block, transform unit 38 may generate the above noted transform unit (TU), which stores information regarding the various transforms that are applied to the residual video data. Transform unit 38 may output TUs to entropy coding unit 46, as shown in the example of FIG. 2.

Quantization unit 40 quantizes (e.g., rounds) the residual transform block coefficients to further reduce bit rate. As mentioned above, quantization unit 40 accounts for the scaled nature of scaled 32-point DCT-II unit 52 by incorporating internal factors removed during factorization. As quantization typically involves multiplication, incorporation of these factors into quantization unit 40 may not increase the implementation complexity of quantization unit 40. In this respect, removing the factors from scaled 32-point DCT-II unit 52 decreases the implementation complexity of DCT-II unit 52 without increasing the implementation complexity of quantization unit 40, resulting in a net decrease of implementation complexity with respect to video encoder 20.

Entropy coding unit 46 entropy codes the quantized coefficients to even further reduce bit rate. Entropy coding unit 46 may perform statistical lossless coding, referred to in some instances, as entropy coding. Entropy coding unit 46 models a probability distribution of quantized DCT coefficients and selects a codebook (e.g., CAVLC or CABAC) based on the modeled probability distribution. Using this codebook, entropy coding unit 46 selects codes for each quantized DCT coefficient in a manner that compresses quantized DCT coefficients. To illustrate, entropy coding unit 46 may select a short codeword (in terms of bits) for frequently occurring quantized DCT coefficients and longer codeword (in term of bits) for less frequently occurring quantized DCT coefficients. So long as the short codeword uses less bits than the quantized DCT coefficients, on average, entropy coding unit 46 compresses the quantized DCT coefficients. Entropy coding unit 46 outputs the entropy coded coefficients as a bitstream which is sent to video decoder 30. Entropy coding unit 46 may also perform lossless statistical coding with respect to PUs and TUs received respectively from motion estimation unit 32 and transform unit 38. Considering that CUs include both a PU and a CU associated with a block of quantized residual video data, entropy coding unit 46 may effectively perform statistical lossless encoding with respect to a CU, inserting the lossless statistically coded CU into the bitstream. In general, video decoder 30 performs inverse operations to decode and reconstruct the encoded video from the bitstream, as will be described with reference to the example of FIG. 3.

Reconstruction unit 42 and inverse transform unit 44 reconstruct quantized coefficients and apply inverse transformation, respectively, to reconstruct the residual data. Inverse transform unit 44 includes an inverse DCT (IDCT), which is commonly referred to as a DCT of type III that performs the inverse operations of 32-point DCT-II unit 52, similar to 32-point DCT-III unit 68 described below with respect to FIG. 3. This inverse 32-point DCT-II is shown as 32-point DCT-III unit 53, which again may be substantially similar to 32-point DCT-II unit 68 shown in the example of FIG. 3. 32-point DCT-III unit 68 may comprise an integrated circuit that performs the techniques and/or one or more processors that execute instructions (or software in the form of a computer-program product) to implement the techniques described in this disclosure. Summation unit 50 adds the reconstructed residual data to the motion compensated prediction block produced by motion compensation unit 36 to produce a reconstructed coding unit for storage in memory 34. The reconstructed coding unit is used by motion estimation unit 32 and motion compensation unit 36 to encode a block in a subsequent video frame.

Figure 3:
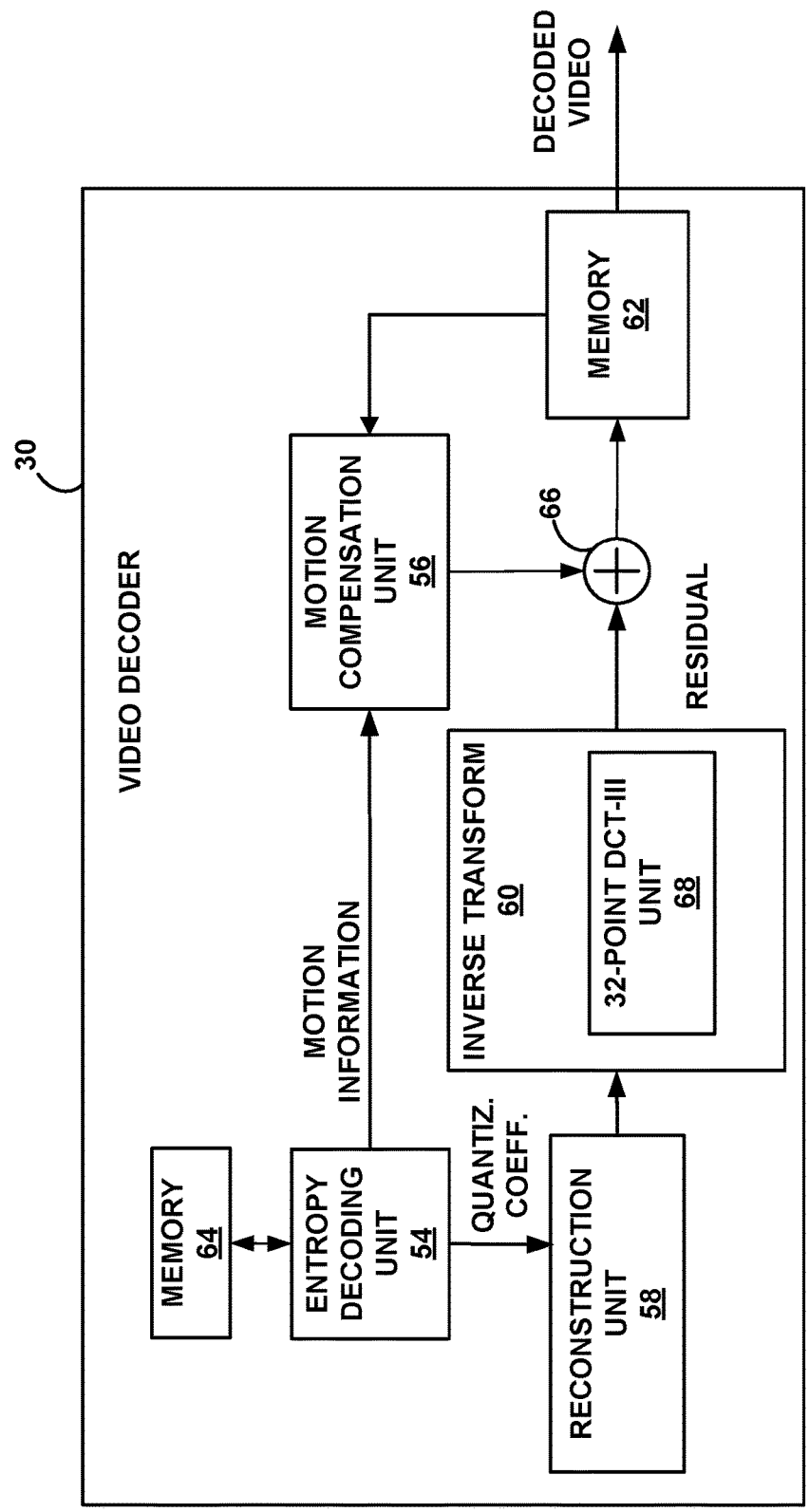
FIG. 3 is a block diagram illustrating the video decoder of FIG. 1 in more detail.

FIG. 3 is a block diagram illustrating an example of video decoder 30 of FIG. 1 in more detail. Video decoder 30 may be formed at least in part as one or more integrated circuit devices, which may be referred to collectively as an integrated circuit device. In some aspects, video decoder 30 may form part of a wireless communication device handset. Video decoder 30 may perform intra- and inter-decoding of blocks within video frames. As shown in FIG. 3, video decoder 30 receives an encoded video bitstream that has been encoded by a video encoder, such as video encoder 20 shown in the examples of FIGS. 1 and 2.

In the example of FIG. 3, video decoder 30 includes entropy decoding unit 54, motion compensation unit 56, reconstruction unit 58, inverse transform unit 60, and memory 62. Entropy decoding unit 64 may access one or more data structures stored in a memory 64 to obtain data useful in coding. Video decoder 30 also may include an in-loop or post loop deblocking filter (not shown) that filters the output of summer 66. Video decoder 26 decoder 30 also includes summer 66. FIG. 3 illustrates the temporal prediction components of video decoder 30 for inter-decoding of coding units. Although not shown in FIG. 3, video decoder 30 also may include spatial prediction components for intra-decoding of some coding units.

Entropy decoding unit 54 receives the encoded video bitstream and performs lossless statistical decoding (which is often referred to by the misnomer "entropy decoding") to decode quantized residual coefficients and quantized parameters, as well as other information, such as coding modes and motion information, which may include motion vectors and block partitions, from the bitstream. In the emerging HEVC standard, entropy decoding unit 54 may perform lossless statistical decoding to decode various portion of a CU, such as a entropy encoded quantized DCT coefficients representing residual video data, a coded PU and a coded TU. Entropy decoding unit 54 outputs the decoded quantized residual data and the decoded PU to motion compensation unit 56. Motion compensation unit 56 receives the decode PU storing the motion vectors and performs motion compensation with respect to one or more reconstructed reference frames stored to memory 62 to output predicted video data.

Reconstruction unit 58 inverse quantizes, i.e., de-quantizes, the quantized block coefficients. Inverse transform unit 60 applies an inverse transform, e.g., an inverse DCT, to the coefficients to produce residual data. More specifically, inverse transform unit 60 includes a 32-point DCT-III unit 68, which inverse transform unit 60 applies to the coefficients to produce residual data. 32-point DCT-III unit 68, which is the inverse of 32-point DCT-II unit 52 shown in the example of FIG. 2, may transform the coefficients from the frequency domain to the spatial domain to produce the residual data. Similar to quantization unit 40 above, reconstruction unit 58 accounts for a scaled nature of 32-point DCT-III unit 68 by incorporating the external factors removed during factorization into the reconstruction process with little if any increase in implementation complexity. Removing factors from scaled 32-point DCT-III unit 68 may reduce implementation complexity, thereby resulting in a net decrease of complexity for video decoder 30.

The prediction units are then summed by summer 66 with the residual data to form decoded blocks. A deblocking filter (not shown in the example of FIG. 3 for ease of illustration purposes) may be applied to filter the decoded blocks to remove blocking artifacts. The filtered blocks are then placed in memory 62, which provides reference frame for decoding of subsequent video frames and also produces decoded video to drive display device 28 (FIG. 1). In some instances, a post loop deblocking filter may be applied to filter frames after they are stored to memory 62 to remove artifacts.

Figure 4A:
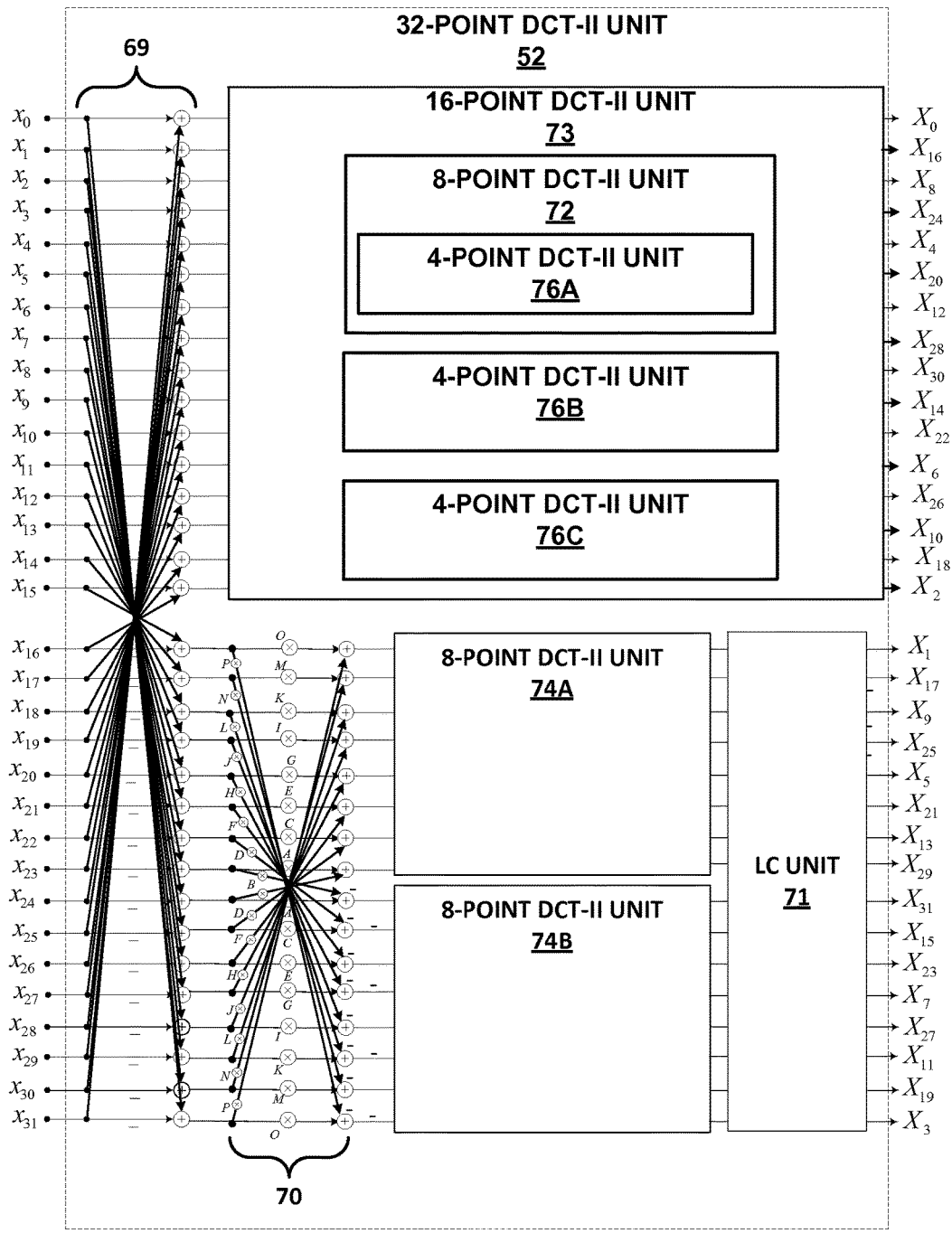
FIGS. 4A-4E are diagrams that illustrate various aspects of the 32-point DCT-II unit of FIG. 2 in more detail.

FIGS. 4A-4E are diagrams that illustrate various aspects of 32-point DCT-II unit 52 in more detail. In the example of FIG. 4A, 32-point DCT-II unit 52 includes a Givens rotation matrix 70, a 16-point DCT-II unit 73, a first 8-point DCT-II unit 74A, a second 8-point DCT-II unit 74B and a linear combination (LC) unit 71, which are each described mathematically below with respect to equation (4). 16-point DCT-II unit 73 includes an 8-point DCT-II unit 72 and two 4-point DCT-II units 76B, 76C. 8-point DCT-II unit 72 in the top half of 32-point DCT-II unit 52 (which is commonly referred to as the "even half" or "even portion" of a DCT) also includes a 4-point DCT-II unit 76A. The lower-half or bottom-half (which is commonly referred to as the "odd half" or "odd portion") of 32-point DCT-II unit 52 includes two 8-point DCT-II units 74A, 74B that are preceded by a so-called Givens rotation matrix 70 that multiplies inputs $x_{16}$-$x_{31}$ (after application of the butterfly) by integer values A-P. 32-point DCT-II unit 52 also includes a cross-additive unit 72 that cross adds the outputs of 8-POINT DCT-II units

74A, 74B. While not shown in the example of FIG. 4A, 8-point DCT-II units 74A, 74B may form or otherwise be included within a 16-point DCT-IV unit capable of implementing a 16-point DCT-IV, which may resemble in form (but be twice as large as) 8-point DCT-IV unit 74.

32-point DCT-II unit 52 receives inputs $x_0$-$x_{31}$ and generates outputs $X_0$-$X_{31}$. Butterfly unit 70 rearranges inputs $x_0$-$x_{31}$ into even inputs $x_0$, $x_2$, $x_4$, $x_6$, $x_8$, $x_{10}$, $x_{12}$, $x_{14}$, $x_{16}$, $x_{18}$, $x_{20}$, $x_{22}$, $x_{24}$, $x_{26}$, $x_{28}$, and $x_{30}$ and odd inputs $x_1$, $x_3$, $x_5$, $x_7$, $x_9$, $x_{11}$, $x_{13}$, $x_{15}$, $x_{17}$, $x_{19}$, $x_{21}$, $x_{23}$, $x_{25}$, $x_{27}$, $x_{29}$, and $x_{31}$ while also performing cross-additions with respect to the even inputs and cross-subtractions with respect to the odd inputs. Butterfly unit 70 outputs the cross-added even inputs to 16-point DCT-II unit 73 and the cross-subtracted odd inputs to 8-point DCT-II unit 74A, 74B. In this example, 32-point DCT-II unit 56 may perform any one of the following sized DCTs: 32-point DCT, a 16-point DCT, an 8-point DCT and 4-point DCT, as well as, perform simultaneously two or three 8-point DCTs, one, two or three 4-point DCTs and one or two 8-point DCTs, or a 16-point DCT and one or two 8-point DCTs.

The letters $A_{32}$-$P_{32}$ shown with respect to Givens rotation matrix 70 refer to internal factors. While not denoted with the subscript number 32 in the example of FIG. 4A, the notation of a letter followed by a number indicates to which of the various DCTs each letter corresponds. Thus, $A_{32}$ denotes the A scaling factor of a 32-point DCT. The outputs, X1 through X31 are scaled by scaling parameters and another parameter due to the factorization process, where these factors are not shown in the example of FIG. 1 for ease of illustration purposes. The scaling factors and/or the other parameter may be denoted as one or more of the variables "ξ" and "η" These factors may be incorporated into the subsequent quantization process without greatly increasing the complexity of the overall video coding process. In this manner, the techniques described in this disclosure may increase utility while reducing chip footprint (or, in other words, decrease so-called board space) and promoting more efficient power consumption.

Figure 4B:
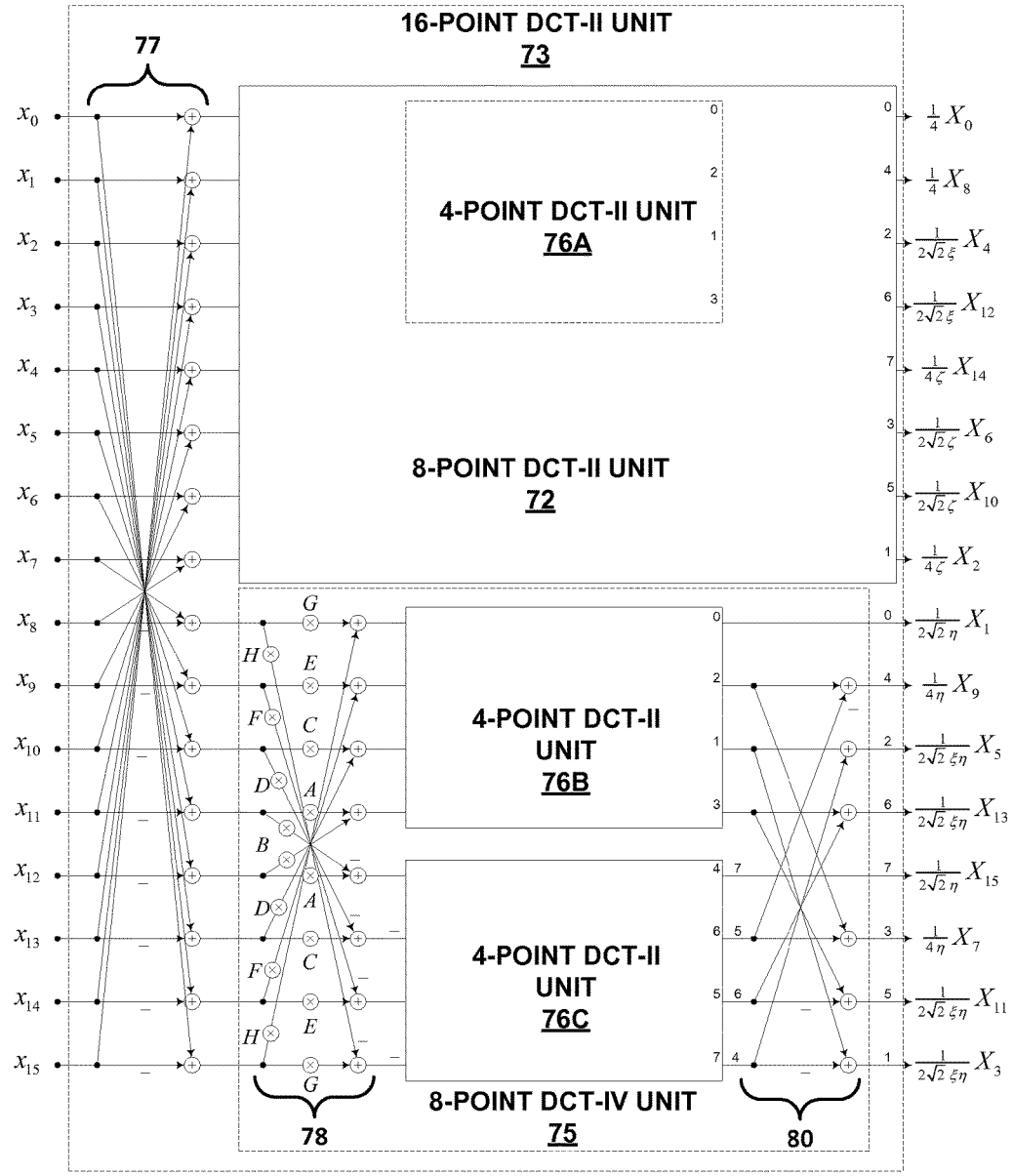

FIG. 4B is a diagram that illustrates an example of 16-point DCT-II unit 73. In the example of FIG. 4B, 16-point DCT-II unit 73 includes a butterfly unit 77, 8-point DCT-II unit 72 and an 8-point DCT-IV unit 74. 8-point DCT-II unit 72 includes 4-point DCT-II unit 76A, while 8-point DCT-IV unit 74 includes 4-point DCT-II unit 76B and 4-point DCT-II unit 76C. 8-point DCT-IV unit 74 also includes a factor multiplication unit 78 and a cross-additive unit 80, which are described below in more detail with respect to the example of FIG. 4E. 16-point DCT-II unit 73 receives inputs $x_0$-$x_{15}$ and generates outputs $X_0$-$X_{15}$. Butterfly unit 70 rearranges inputs $x_0$-$x_{15}$ into even inputs $x_0$, $x_2$, $x_4$, $x_6$, $x_8$, $x_{10}$, $x_{12}$, and $x_{14}$ and odd inputs $x_1$, $x_3$, $x_5$, $x_7$, $x_9$, $x_{11}$, $x_{13}$, and $x_{15}$, while also performing cross-additions with respect to the even inputs and cross-subtractions with respect to the odd inputs. Butterfly unit 70 outputs the cross-added even inputs to 8-point DCT-II unit 72 and the cross-subtracted odd inputs to 8-point DCT-14 unit 74.

Figure 4C:
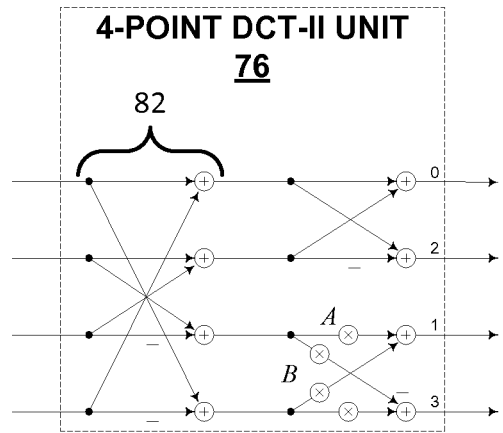

FIG. 4C is a diagram that illustrates an example of any one of 4-point DCT-II unit 76A-76C in more detail. To reflect that the 4-point DCT-II unit shown in the example of FIG. 4B may represent any one of 4-point DCT-II units 76A-76C, the 4-point DCT-II unit shown in the example of FIG. 4B is generally referred to as 4-point DCT-II unit 76. 4-point DCT-II unit 76 includes a butterfly unit 82 that is substantially similar to butterfly units 69 or 77 in terms of functionality, but different in terms of scale as butterfly unit 82 only receives four inputs instead of 32 or 16. Butterfly unit 82 rearranges the inputs into even and odd inputs, as denoted by the '0' and '2' notation on the two upper outputs and the '1' and '3' notation on the two lower outputs. The portion of 4-point DCT-II unit 76 that operates on the odd inputs may be referred to as the odd portion while the portion that operates on the even inputs may be referred to as the even portion.

In the odd portion, two factors denoted A and B are shown to be applied to the odd inputs (where these factors may also be denoted as A4 and B4 when referred to outside of the context of FIG. 4C). In determining the value of these factors, a designer may balance a number of concerns. Often, factors that are a power of two can be easily performed considering that a multiplication by a factor that is a power of two normally involves only a right shift in a binary system. Consequently, factors that are a power of two are favored, although such factors may not adequately reflect DCT coefficients with sufficient precision to provide significant coding gain or compression efficiency. Alternatively, factors that are not a power of two may provide more precision but may not be as easily implemented, thereby increasing implementation complexity. Moreover, larger factors generally provide more coding gain but require significant more storage space while smaller factors may consume less storage space but provide less coding gain. In any event, a number of tradeoffs are involved in selecting factors for any given DCT implementation, such as the DCT implementation represented by 4-point DCT-II unit 76. Various combinations of factors are described below that illustrate these various tradeoffs in more detail.

Figure 4D:
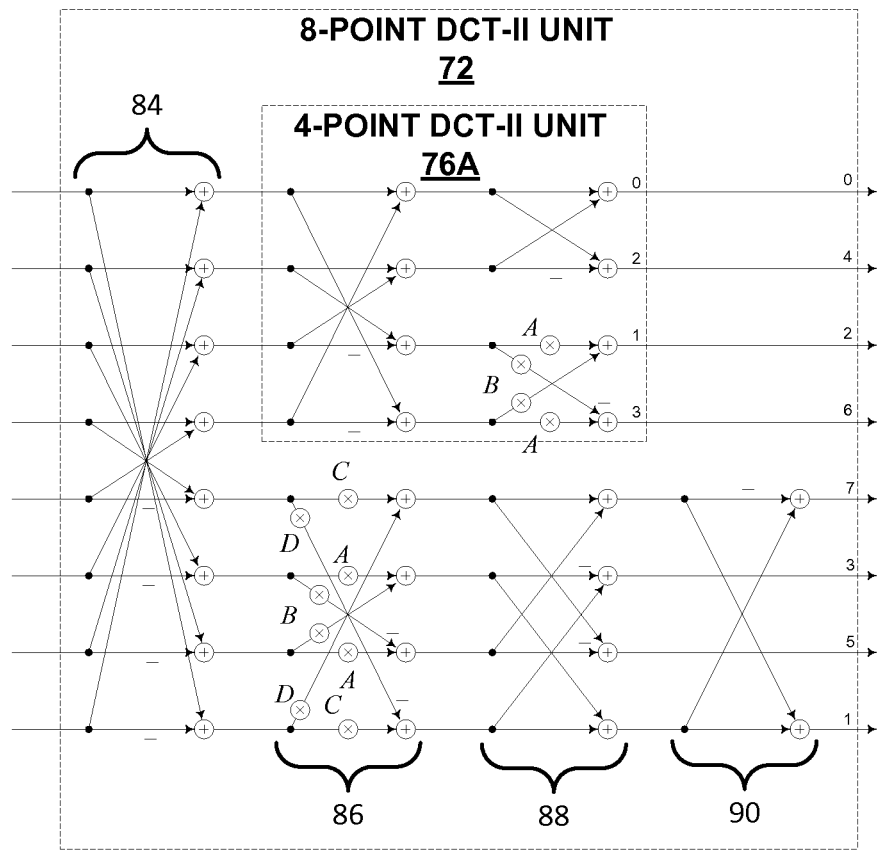

FIG. 4D is a block diagram illustrating 8-point DCT-II unit 72 in more detail. In the example of FIG. 4C, 8-point DCT-II unit 72 includes a butterfly unit 84 that is substantially similar to butterfly units 69, 77 and 82 in function, but different in scale, considering that butterfly unit 84 receives only 8 inputs in comparison to the 32, 16 and 4 inputs received by butterfly units 69, 77 and 82, respectively. In any event, butterfly unit 84 rearranges its inputs into even and odd inputs while also performing cross-additions to generate the even inputs and cross-subtractions to generate the odd inputs. The portion of 8-point DCT-II unit 72 that operates on the even inputs may be referred to as the even portion while the portion that operates on the odd inputs may be referred to as the odd portion. The even portion in this instance comprises a nested 4-point DCT-II unit 76A, which is substantially similar to 4-point DCT-II unit 76 described above with respect to the example of FIG. 4C.

The odd portion of 8-point DCT-II unit 72 includes a number of units 86-90 that each perform various mathematical operations. Factor multiplication unit 86 performs cross additions of the odd inputs after multiplying these inputs by factors A, B, C, and D (where these factors may also be denoted as A8, B8, C8 and D8 when referred to outside of the context of FIG. 4D). Factors A, B, C, and D represent variables that can be modified in the manner described above to promote various benefits. Cross-addition unit 88 performs a cross addition in the manner shown with respect to the example of FIG. 4C while cross-addition unit 90 performs cross-addition of the outer add inputs to generate odd outputs denoted 7 and 1. Again, various combinations of the factors are described below that illustrate these various tradeoffs in more detail.

Figure 4E:
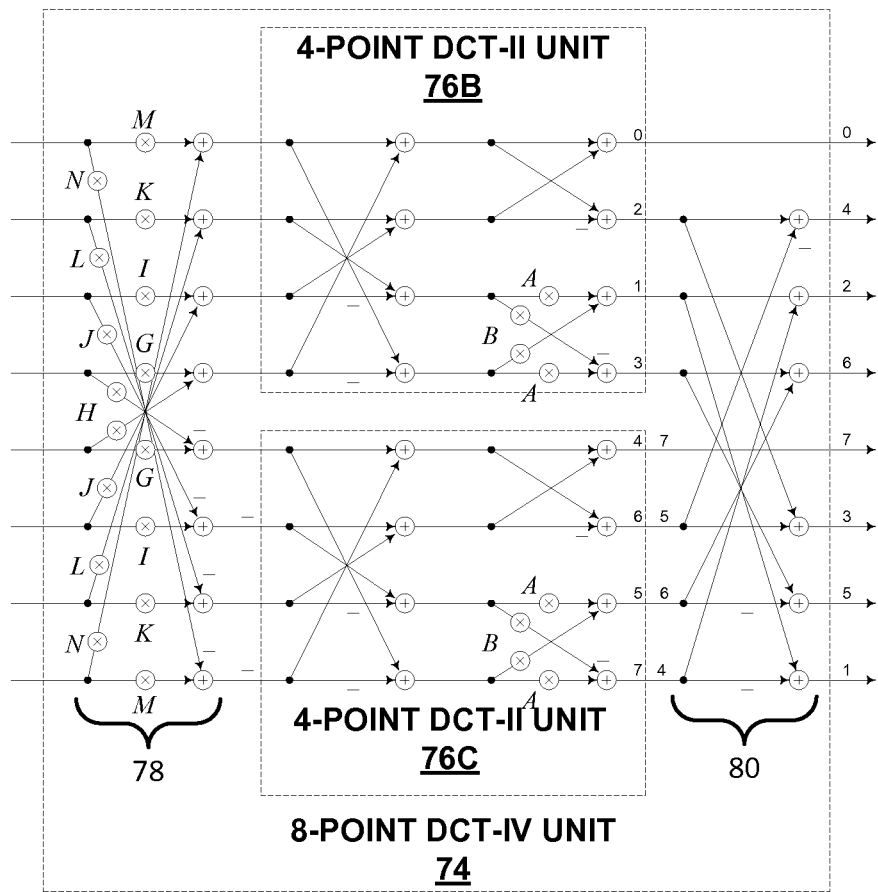

FIG. 4E is a block diagram illustrating 8-point DCT-IV unit 74 in more detail. In the example of FIG. 4E, 8-point DCT-IV unit 74 includes, as noted above, two 4-point DCT-II units 76B, 76C, each of which may be substantially similar to 4-point DCT-II unit 76 described above with respect to the example of FIG. 4C. 8-point DCT-IV unit 74, again as noted above, also includes factor multiplication unit 78 and cross-additive unit 80. Factor multiplication unit 78 multiplies the inputs to 8-point DCT-IV unit 74 by factors H, I, J, K, L, M, and N, and once multiplied by the factors, cross-adds the upper four inputs with the lower four inputs and cross-subtracts the upper four inputs from the lower four inputs. The upper four inputs then are processed by 4-point DCT-II unit 76B, while the lower four inputs are processed by 4-point DCT-II unit 76C. Cross-additive unit 80 then cross adds/subtracts (where subtraction is consider another form of addition) the lower seven inputs. The factors M, N, K, L, I, J, G, and H correspond to A16, B16, C16, D16, E16, F16, G16, and H16 in other places in this specification.

Generally, each of the above described DCT-II or DCT-IV units 72, 74 and 76A-76C may be represented as a multiplier-less implementation with respect to the above noted factors A4, B4, A8-D8, A16-H16 and A32-P32. Again, as noted above, A4 and B4 refer to the butterfly factors in the odd (lower) part of the 4-point DCT type II transform. A8-D8 refer to the butterfly factors in the odd (lower) part of the 8-point DCT type II transform. A16-H16 refer to the butterfly factors in the odd (lower) part of the 16-point DCT type II transform. Finally, A32-P32 (which may also be denoted as A32-P32) refer to the butterfly factors in the odd (lower) part of the 16-point DCT type II transform.

32-point DCT-II unit 52 may comprise a scaled transform where each output coefficient may need to be normalized by a scale factor. In addition, there may be another scale factor of $\sqrt{2/N}$, where N is the size of the one-dimensional (1-D) DCT. The additional scale factor may be necessary to make the 32-point DCT-II unit 52 orthonormal. For two-dimensional transforms, the additional scale factor is 2/N. For the JCT-VC test model, transform sizes of 4, 8, 16, and 32 are used. In that case, this specific scale factor can be absorbed into the quantizer step-sizes as bit-shifts. This will be described in detail later. Now the design of the 32-point DCT-II transform 52 will be described in greater detail. First consider that the matrix of DCT coefficients may be represented by the following equation (1). In this discussion, the scaling factor that are necessary to make the DCT orthonormal may be ignored for purposes of explanation:

$$C_N^{II}(i,j) = \cos\left(\frac{\pi(2i+1)j}{2N}\right), i,j = 0, \ldots, N-1, \quad (1)$$

which can be factored into half-sized DCT-II and DCT-IV blocks according to the following equation (2):

$$C_N^{II} = P_N \begin{pmatrix} C_{N/2}^{II} & 0 \\ 0 & C_{N/2}^{IV}J_{N/2} \end{pmatrix} \begin{pmatrix} I_{N/2} & J_{N/2} \\ J_{N/2} & -I_{N/2} \end{pmatrix}, \quad (2)$$

where $I_{N/2}$ and $J_{N/2}$ denote N/2×N/2 identity and order reversal matrices correspondingly, and $C_{N/2}^{IV}$ denotes the matrix of DCT-IV transform defined in accordance with the following equation (3):

$$C_N^{IV}(i,j) = \cos\left(\frac{\pi}{N}\left(i+\frac{1}{2}\right)\left(j+\frac{1}{2}\right)\right), i,j = 0, \ldots, N-1. \quad (3)$$

In turn, the DCT-IV can be split according to the following equation (4):

$$C_N^{IV} = P_N^T \begin{pmatrix} 1 & & & 0 \\ & I_{N/2-1} & I_{N/2-1} & \\ & I_{N/2-1} & -I_{N/2-1} & \\ 0 & & & -1 \end{pmatrix} \quad (4)$$

$$\begin{pmatrix} I_{N/2} & 0 \\ 0 & E_{N/2}J_{N/2} \end{pmatrix} \begin{pmatrix} C_{N/2}^{II} & 0 \\ 0 & C_{N/2}^{II} \end{pmatrix} \begin{pmatrix} I_{N/2} & 0 \\ 0 & E_{N/2} \end{pmatrix} R_N,$$

where:

$P_N$ is a permutation matrix producing reordering according to the following equation (5):

$$x'_i = x_{2i}, x'_{N/2+i} = x_{2i+1}, i = 0, 1, \ldots, N/2-1, \quad (5)$$

$E_{N/2}$ is the diagonal sign-alteration matrix defined in accordance with the below equation (6):

$$E_{N/2} = \text{diag}\{(-1)^k\}, k = 0, 1, \ldots N/2-1, \quad (6)$$

$R_N$ is the Givens rotation matrix as defined mathematically by equation (7) that follows below:

$$R_N = \begin{pmatrix} \cos\frac{\pi}{4N} & & & & & & & \sin\frac{\pi}{4N} \\ & \cos\frac{3\pi}{4N} & & & & & \sin\frac{3\pi}{4N} & \\ & & \ddots & & & \cdot^{\cdot^{\cdot}} & & \\ & & & \cos\frac{(N-1)\pi}{4N} & \sin\frac{(N-1)\pi}{4N} & & & \\ & & & -\sin\frac{(N-1)\pi}{4N} & \cos\frac{(N-1)\pi}{4N} & & & \\ & & \cdot^{\cdot^{\cdot}} & & & \ddots & & \\ & -\sin\frac{3\pi}{4N} & & & & & \cos\frac{3\pi}{4N} & \\ -\sin\frac{\pi}{4N} & & & & & & & \cos\frac{\pi}{4N} \end{pmatrix}, \quad (7)$$

and $CH_{N/2}^{II}$ denotes matrices of the remaining half-sized DCT-II transforms.

Hence, to compute N=32-point transform, this factorization will effectively split it into: 1) 16-point DCT-II residing in the even part of the transform, 2) two 8-point DCT-II in the odd part of the transform and 3) one 16-point butterfly implied by Givens rotation matrix $R_{16}$.

To approximate the 32-point DCT-II transform in fixed point implementations, the sine and cosine terms in the Givens rotation matrix $R_{16}$ may be approximated by integers or dyadic rationals. This approximation may be accomplished by choosing constants A32-P32 such that each pair of constants (such as A32, B32 or C32, D32) approximates a pair of sine and cosine terms. In this way, a dyadic rational may be defined as a rational number where the denominator is a power of 2. As an example, A32 and B32 may be chosen such that $$\cos\left(\frac{\pi}{64}\right) \approx \frac{A32}{\sqrt{A32^2 + B32^2}} \text{ and } \sin\left(\frac{\pi}{64}\right) \approx \frac{B32}{\sqrt{A32^2 + B32^2}}.$$

Similarly, C32 and D32 may be chosen such that $$\cos\left(\frac{3\pi}{64}\right) \approx \frac{C32}{\sqrt{C32^2 + D32^2}} \text{ and }$$

$$\sin\left(\frac{3\pi}{64}\right) \approx \frac{D32}{\sqrt{C32^2 + D32^2}} \text{ and so on.}$$

The scale factor Z32 may be chosen according to equation (8) below:

$$Z32 = \sqrt{A32^2 + B32^2} = \sqrt{C32^2 + D32^2} = \sqrt{E32^2 + F32^2} = \sqrt{G32^2 + H32^2}$$
$$= \sqrt{I32^2 + J32^2} = \sqrt{K32^2 + L32^2} = \sqrt{M32^2 + N32^2} = \sqrt{O32^2 + P32^2}. \quad (8)$$

Alternatively, values for Z32 may be chosen in accordance equation (9) below:

$$Z32 \in \left\{\frac{M+N}{\mu+\nu}; M, N \in \{A, B, \ldots, O, P\}, \right. \quad (9)$$
$$\left. \mu, \nu \in \left\{\cos\left(\frac{\pi k}{64}\right), \sin\left(\frac{\pi k}{64}\right); k = 1, \ldots, 15\right\}\right\}.$$

By choosing these factors, the resulting implementation may produce balanced worse case approximation errors. The first condition for Z32 (as specified in equation 8) produces orthogonal 32-point DCT-II transform design, whereas the second condition (as specified in equation 9) produces a non-orthogonal design. In implementing this design, the scale factor Z32 may be moved all the way to the right hand side in FIG. 4A. Thus, by approximating the sine and cosine terms in the Givens rotation matrix $R_{16}$, a scaled approximation of the 32-point DCT-II may be obtained. Such a 32-point scaled DCT-II transform 52 may be specified by determining the internal factors A32-P32 and the scaled 16-point DCT-II 73 in the manner noted above. The scaled 16-point DCT-II 73, as shown in FIG. 4B can be specified by specifying parameters A4, B4, A8-D8, and A16-H16.

In one example, A16-H16 approximate the sine and cosine terms in the Givens rotation matrix $R_8$ for representing a 16-point DCT-II. The corresponding scale factor, in this example, is Z16. Similarly, A8-D8 approximate the sine and cosine terms in the Givens rotation matrix $R_4$ for representing an 8-point DCT-II. The corresponding scale factor is Z8. Additionally, A4 and B4 approximate the sine and cosine terms in the Givens rotation matrix $R_2$ for representing a 4-point DCT-II. The corresponding scale factor is Z4. The parameters A4, B4, A8-D8, and A16-H16 may satisfy the relations specified by equation (10) below:

$$Z4=\sqrt{A4^2+B4^2}, Z8=\sqrt{A8^2+B8^2}=\sqrt{C8^2+D8^2}, \text{ and}$$

$$Z16=\sqrt{A16^2+B16^2}=\sqrt{C16^2+D16^2}=\sqrt{E16^2+F16^2}=$$
$$\sqrt{G16^2+H16^2}. \quad (10)$$

Table 1, shown below, provides exemplary values of these scale factors for the 32-point DCT-II transform. These scale factors may not be included within the 32-point DCT-II unit 73 but may instead be removed and incorporated into the quantization unit 40. These scale factors, also referred to as normalization factors, may improve implementation complexity by reducing the number of multiplications or arithmetic operations. If these scale factors are removed, the 32-point DCT-II unit 72 is referred to as a scaled 32-point DCT-II unit 72 considering that the 32-point DCT-II unit 72 outputs scaled outputs that require multiplication by scale factors to properly generate full, non-scaled outputs that accurately represent DCT coefficients. If 32-point DCT-II unit 72 retains these external factors, 32-point DCT-II unit 72 is referred to as a full 32-point DCT-II unit 72. Depending on the context, either a full or scaled unit may be employed for 32-point DCT-II unit 72, and the techniques of this disclosure should not be limited to any type of full or scaled implementation. Furthermore as noted before, an additional scale factor of 2/N is necessary for an N-point DCT II transform to make it orthonormal.

TABLE 1

| Index | norm factor | Index | norm factor |
|---|---|---|---|
| 0 | 1/$\sqrt{2}$ | 1 | 1/Z32 |
| 2 | 1/Z16 | 3 | 1/($\sqrt{2}$ * Z8 * Z32) |
| 4 | 1/($\sqrt{2}$ * Z8) | 5 | 1/($\sqrt{2}$ * Z8 * Z32) |
| 6 | 1/(Z4 * Z16) | 7 | 1/ (Z4 * Z32) |
| 8 | 1/Z4 | 9 | 1/(Z4 * Z32) |
| 10 | 1/(Z4 * Z16) | 11 | 1/(Z8 * Z32) |
| 12 | 1/Z8 | 13 | 1/(Z8 * Z32) |
| 14 | 1/($\sqrt{2}$ * Z16) | 15 | 1/($\sqrt{2}$ * Z32) |
| 16 | 1/$\sqrt{2}$ | 17 | 1/($\sqrt{2}$ * Z32) |
| 18 | 1/($\sqrt{2}$ * Z16) | 19 | 1/ (Z8 * Z32) |
| 20 | 1/Z8 | 21 | 1/(Z8 * Z32) |
| 22 | 1/(Z4 * Z16) | 23 | 1/ (Z4 * Z32) |
| 24 | 1/Z4 | 25 | 1/(Z4 * Z32) |
| 26 | 1/(Z4 * Z16) | 27 | 1/($\sqrt{2}$ * Z8 * Z32) |

TABLE 1-continued

| Index | norm factor | Index | norm factor |
|---|---|---|---|
| 28 | $1/(\sqrt{2} * Z8)$ | 29 | $1/(\sqrt{2} * Z8 * Z32)$ |
| 30 | $1/Z16$ | 31 | $1/Z32$ |

In any event, above are some exemplary implementation specific values that may be selected for the above internal and normalization factors to generate a 32-point DCT-II unit 52 that provides various benefits. As a general note, the above values for the internal factors and scale factors are selected such that the resulting DCT matrices retain an orthogonality property, which is defined by the following equation (11):

$$C^T C = aI \quad (11)$$

where C represents the full non-scaled transform matrix and $C^T$ represents the transpose of matrix C, I is the identity matrix and a is a scalar constant. If the constant takes the value of 1, the matrix is orthonormal. Generally, orthogonality is desired with respect to DCT-II implementations but choosing a non-orthogonal design may reduce the magnitude of the internal factors for similar approximation error.

A survey of various values for internal factors A4-B4, A8-D8, A16-H16 and A32-P32 provides some indication as to the tradeoffs involved in selecting these values. Beginning with 4-point DCT-II units 76 and internal factors A4 and B4, an analysis of values for these factors is set forth in the following Table 2.

TABLE 2

| Parameters | | | Approximation errors | | |
|---|---|---|---|---|---|
| A4 | B4 | Z4 | $\cos\left(\frac{3\pi}{8}\right) - \frac{A4}{Z4}$ | $\sin\left(\frac{3\pi}{8}\right) - \frac{B4}{Z4}$ | Bits used |
| 1 | 2 | $\sqrt{5}$ | −0.0645302 | 0.0294523 | 1 |
| 2 | 5 | $\sqrt{29}$ | 0.0112928 | −0.00459716 | 2 |
| 3 | 7 | $\sqrt{58}$ | −0.0112359 | 0.0047345 | 3 |
| 5 | 12 | 13 | −0.00193195 | 0.000802609 | 4 |
| 17 | 41 | $\sqrt{1970}$ | −0.00033159 | 0.000137419 | 5 |

With reference to Table 2, values for internal factors A4 and B4 are shown with respect to approximation errors and the number of bits required to store internal factors A4 and B4. Generally, as the values for internal factors A4 and B4 increase in size, the approximation error decreases and the number of bits required to store them increases.

Continuing the survey with respect to 8-point DCT-II unit 72 and internal factors A8-D8, an analysis of values for these factors is set forth in the following Table 3.

TABLE 3

| Parameters | | | | | Approximation errors | | | | |
|---|---|---|---|---|---|---|---|---|---|
| A8 | B8 | C8 | D8 | Z8 | $\cos\left(\frac{\pi}{16}\right) - \frac{A8}{Z8}$ | $\sin\left(\frac{\pi}{16}\right) - \frac{B8}{Z8}$ | $\cos\left(\frac{3\pi}{16}\right) - \frac{C8}{Z8}$ | $\sin\left(\frac{3\pi}{16}\right) - \frac{D8}{Z8}$ | Bits used |
| 1 | 1 | 1 | 1 | 1.41421 | 0.273678 | −0.512016 | 0.124363 | −0.151537 | 1 |
| 3 | 1 | 3 | 1 | 3.16228 | 0.032102 | −0.121137 | −0.117214 | 0.239342 | 2 |
| 5 | 2 | 5 | 2 | 5.38516 | 0.052308 | −0.1763 | −0.097007 | 0.18418 | 3 |
| 11 | 3 | 9 | 7 | 11.4018 | 0.016021 | −0.068027 | 0.042117 | −0.058370 | 4 |
| 19 | 4 | 16 | 11 | 19.4165 | 0.002235 | −0.010920 | 0.007427 | −0.010958 | 5 |
| 38 | 8 | 32 | 22 | 38.833 | 0.002235 | −0.010920 | 0.007427 | −0.010958 | 6 |
| 65 | 13 | 55 | 37 | 66.2873 | 0.000204 | −0.001025 | 0.001747 | −0.002606 | 7 |
| 111 | 22 | 94 | 63 | 113.159 | −0.00013 | 0.0006739 | 0.000781 | −0.001167 | 8 |

Similar to the analysis set forth in Table 2 above, as the values for internal factors A8-D8 increase in size, the approximation error decreases and the number of bits required to store these larger values increases.

The analysis for internal factors A16-H16 of 16-point DCT-II unit 73 is set forth in the following Table 4.

TABLE 4

| Parameters | | | | | | | | | | |
|---|---|---|---|---|---|---|---|---|---|---|
| B16 | D16 | F16 | H16 | G16 | E16 | C16 | A16 | Z16 | Max. Error | Bits used |
| 1 | 1 | 1 | 1 | 1 | 1 | 1 | 1 | 1.41421 | 0.60909 | 1 |
| 1 | 1 | 1 | 1 | 3 | 3 | 3 | 3 | 3.16228 | 0.318166 | 2 |
| 2 | 2 | 2 | 2 | 5 | 5 | 5 | 5 | 5.38516 | 0.273374 | 3 |
| 3 | 3 | 7 | 7 | 9 | 9 | 11 | 11 | 11.4018 | 0.1651 | 4 |
| 1 | 6 | 10 | 10 | 15 | 15 | 17 | 18 | 18.0278 | 0.0833035 | 5 |
| 6 | 11 | 21 | 27 | 34 | 38 | 42 | 43 | 43.4166 | 0.0401789 | 6 |
| 7 | 17 | 31 | 37 | 49 | 53 | 59 | 61 | 61.4003 | 0.0334866 | 7 |
| 29 | 67 | 116 | 148 | 181 | 203 | 224 | 232 | 233.8055 | 0.026018 | 8 |

Similar to the analysis set forth in Tables 2 and 3 above, as the values for internal factors A16-H16 increase in size, the maximum approximation error decreases and the number of bits required to store these larger values increases. With respect to the analysis set forth in Table 4, the maximum approximation error is so large with respect to the first 5 combinations of internal factors that the choice of values for internal factors A16-H16 is between 6-, 7- and 8-bit approximations.

The analysis for internal factors A32-P32 of Givens rotation matrix R16 70 of 32-point DCT-II unit 52 is set forth in the following Table 5 for the case of orthogonal design.

A number of matrix coefficients shown in the above Tables 4-5 are large values that may increase implementation complexity in terms of operations required to perform multiplications by these large values. Also, in FIG. 4A, as the calculations proceed from the left side to the right, the bitdepth may increase. This may be costly in terms of storage buffers as well as the cost of performing arithmetic operations (additions, multiplications). To remove these large values and balance dynamic range across the transform, right shifts may be introduced into the implementation after multiplications by the internal factors or equivalently after the butterfly stages. This may be equivalent to choosing dyadic rationals instead of integers for internal factors A4,

TABLE 5

| Parameters | | | | | | | |
|---|---|---|---|---|---|---|---|
| B32 | 1 | 1 | 2 | 1 | 1 | 9 | 34 |
| D32 | 1 | 1 | 2 | 1 | 1 | 33 | 146 |
| F32 | 1 | 1 | 2 | 1 | 6 | 71 | 251 |
| H32 | 1 | 1 | 2 | 4 | 6 | 89 | 331 |
| J32 | 1 | 1 | 2 | 4 | 6 | 99 | 421 |
| L32 | 1 | 1 | 2 | 4 | 10 | 127 | 538 |
| N32 | 1 | 1 | 2 | 4 | 10 | 159 | 586 |
| P32 | 1 | 1 | 2 | 4 | 10 | 177 | 674 |
| O32 | 1 | 3 | 5 | 7 | 15 | 181 | 757 |
| M32 | 1 | 3 | 5 | 7 | 15 | 197 | 827 |
| K32 | 1 | 3 | 5 | 7 | 15 | 219 | 859 |
| I32 | 1 | 3 | 5 | 7 | 17 | 233 | 922 |
| G32 | 1 | 3 | 5 | 7 | 17 | 237 | 958 |
| E32 | 1 | 3 | 5 | 8 | 17 | 243 | 982 |
| C32 | 1 | 3 | 5 | 8 | 18 | 251 | 1003 |
| A32 | 1 | 3 | 5 | 8 | 18 | 253 | 1013 |
| Z32 | 1.41421 | 3.16228 | 5.38516 | 8.06226 | 18.0278 | 253.16003 | 1013.50742 |
| Max Error | 0.658039 | 0.355331 | 0.322323 | 0.17542 | 0.116859 | 0.037 | 0.017545 |
| Bits Used | 1 | 2 | 3 | 4 | 5 | 8 | 10 |

The following Table 6 presents the analysis of internal factors A32-P32 of Givens rotation matrix R16 70 when an orthogonal design may not be required:

B4, A8-D8, A16-H16, and A32-P32. One such choice for internal factors is shown in Tables 7 above. It should be noted that the right shifts may be by an arbitrary positive

TABLE 6

| Parameters | | | | | | | | | | | | | | | | Max. Error | Bits used |
|---|---|---|---|---|---|---|---|---|---|---|---|---|---|---|---|---|---|
| B | D | F | H | J | L | N | P | O | M | K | I | G | E | C | A | Z32 | |
| 1 | 1 | 1 | 1 | 1 | 1 | 1 | 1 | 1 | 1 | 1 | 1 | 1 | 1 | 1 | 1 | 1.90865 | 0.474864 | 1 |
| 1 | 1 | 1 | 1 | 1 | 1 | 2 | 2 | 2 | 2 | 3 | 3 | 3 | 3 | 3 | 3 | 3.51999 | 0.235024 | 2 |
| 1 | 1 | 1 | 2 | 2 | 3 | 3 | 4 | 4 | 5 | 5 | 5 | 6 | 6 | 6 | 6 | 6.20379 | 0.112124 | 3 |
| 1 | 2 | 3 | 4 | 5 | 6 | 7 | 8 | 8 | 9 | 10 | 10 | 11 | 11 | 11 | 11 | 11.3921 | 0.0387122 | 4 |

It should be noted that the list of factorizations shown in Tables 2-6 are merely exemplary and should not be considered exhaustive. Other choices for internal factors A4, B4, A8-D8, A16-H16, and A32-P32 are possible as long as relationships between the internal factors and scale factors Z4, Z8, Z16, and Z32 as specified in equations (8) (or 9) and (10) are satisfied. With the above survey analysis complete, a number of different implementations or designs may result through various selections of values for internal factors A4, B4, A8-D8, A16-H16, and A32-P32 from the above Tables 2-6.

integer. In some instances, the only restriction in specifying the extent of right shifts is that the right shifts for parameters A4 and B4 are the same. Similarly, in some instances, right shifts for A8-D8, respectively should be the same. Moreover, right shifts (again, in some instances) for A16-H16 may be the same. Additionally, the right shifts for A32-P32 may be the same in some instances. The right shifts in the odd parts of 32-point, 16-point, 8-point and 4-point transforms may be chosen independently. The right shifts convert these integer parameters into dyadic rationals. Again, a dyadic rational refers to a rational number where the denominator is a power of two.

TABLE 7

| A4 | B4 | A8 | B8 | C8 | D8 |
|---|---|---|---|---|---|
| 17/64 | 41/64 | 111/128 | 22/128 | 94/128 | 63/128 |

| A16 | B16 | C16 | D16 | E16 | F16 | G16 | H16 |
|---|---|---|---|---|---|---|---|
| 232/256 | 29/256 | 224/256 | 67/256 | 203/256 | 116/256 | 181/256 | 148/256 |

| A32 | C32 | E32 | G32 | I32 | K32 | M32 | O32 |
|---|---|---|---|---|---|---|---|
| 1013/1024 | 1003/1024 | 982/1024 | 958/1024 | 922/1024 | 859/1024 | 827/1024 | 757/1024 |

| B32 | D32 | F32 | H32 | J32 | L32 | N32 | P32 |
|---|---|---|---|---|---|---|---|
| 34/1024 | 146/1024 | 251/1024 | 331/1024 | 421/1024 | 538/1024 | 586/1024 | 674/1024 |

In case of dyadic rational internal factors (since both factors in a butterfly share the same right shifts), the right shifts may be performed at the end of the butterfly. In these instances, integer and dyadic rational factors may be treated in the same manner. The multiplications in a butterfly may then be converted into shifts and additions. Table 8 shows this for the exemplary values of internal factors listed in Table 7.

TABLE 8

| Pair of factors | 1st factor (A) | 2nd factor (B) | Algorithm: $y = A * x; z = B * x;$ | Complexity Additions | Shifts |
|---|---|---|---|---|---|
| A4, B4 | 17 | 41 | $x1 = x \ll 4$; $x2 = x \ll 3$; $x3 = x1 + x2$; $y = x + x1$; $z = x3 + x4$; | 3 | 2 |
| A8, B8 | 111 | 22 | $x1 = x \ll 3$; $x2 = x1 - x$; $x3 = x2 \ll 4$; $x4 = x2 \ll 1$; $y = x3 - x$; $z = x1 + x4$; | 3 | 3 |
| C8, D8 | 94 | 63 | $x1 = x \ll 5$; $x2 = x - x1$; $z = x1 - x2$; $y = z - x2$; | 3 | 1 |
| A16, B16 | 232 | 29 | $x1 = x \ll 2$; $x2 = x1 - x$; $x3 = x1 \ll 3$; $z = x3 - x2$; $y = z \ll 3$; | 2 | 3 |
| C16, D16 | 224 | 67 | $x1 = x \ll 5$; $x2 = x + x1$; $x3 = x2 \ll 1$; $z = x + x3$; $x5 = x1 \ll 3$; $y = x5 - x1$; | 3 | 3 |
| E16, F16 | 203 | 116 | $x2 = x + (x \ll 1)$; $x3 = x \ll 5$; $x4 = x3 - x2$; $x5 = x4 \ll 3$; $z = x4 \ll 2$; $y = x5 - x4$; | 3 | 4 |
| G16, H16 | 181 | 148 | $x1 = x \ll 5$; $x2 = x \ll 2$; $x3 = x + x1$; $x4 = x2 + x3$; $z = x4 \ll 2$; $y = x3 + z$; | 3 | 3 |
| A32, B32 | 1013 | 34 | $x1 = x \ll 3$; $x2 = x \ll 1$; $x3 = x1 + x2$; $x4 = x \ll 10$; $x5 = x4 - x$; $x6 = x1 \ll 2$; $z = x2 + x6$; $y = x5 - x3$; | 4 | 4 |
| C32, D32 | 1003 | 146 | $x2 = x + (x \ll 6)$; $x4 = x2 + (x \ll 3)$; $x6 = x + (x \ll 2)$; $x8 = (x \ll 10) - x$; $x9 = x6 \ll 2$; $y = x8 - x9$; $z = x4 \ll 1$; | 5 | 6 |
| E32, F32 | 982 | 251 | $x1 = x \ll 2$; $x2 = x \ll 4$; $x3 = x + x1$; $x4 = x2 \ll 4$; $z = x4 - x3$; $x6 = x2 - x4$; $x7 = z - x6$; $y = x7 \ll 1$; | 4 | 4 |
| G32, H32 | 958 | 331 | $x2 = x + (x \ll 5)$; $x4 = (x \ll 9) - x2$; $x6 = x2 + (x5 \ll 2)$; $z = x + (x6 \ll 1)$; $y = x4 \ll 1$; | 4 | 5 |
| I32, J32 | 922 | 421 | $x2 = (x \ll 3) - x$; $x4 = (x2 \ll 1) - x$; $x6 = x4 + (x2 \ll 6)$; $x8 = (x2 \ll 5) - x2$; $z = (x8 \ll 1) - x4$; $y = x6 \ll 1$; | 5 | 6 |
| K32, L32 | 859 | 538 | $x2 = x + (x \ll 5)$; $x4 = (x \ll 8) - x2$; $y = (x4 \ll 2) - x2$; $x7 = x + (x2 \ll 3)$; $x9 = x7 + (x \ll 2)$; $z = x9 \ll 1$; | 5 | 6 |
| M32, N32 | 827 | 586 | $x2 = x + (x \ll 2)$; $x4 = x2 + (x \ll 8)$; $x6 = x4 + (x \ll 5)$; $x8 = (x2 \ll 6) - x2$; $y = x8 + (x \ll 9)$; $z = x6 \ll 1$; | 5 | 6 |
| O32, P32 | 757 | 674 | $x2 = (x \ll 2) - x$; $x4 = x2 + (x2 \ll 8)$; $y = x4 - (x2 \ll 2)$; $x7 = x + (x2 \ll 7)$; $x9 = x7 - (x2 \ll 4)$; $z = x9 \ll 1$; | 5 | 6 |

If the 32-point DCT-II is implemented with multiplications and additions, 116 multiplications and 194 additions may be required. This number typically remains the same even when a different set of internal factors is chosen instead of those from Table 7. When the implementation is multiplierless, however, higher magnitude (e.g., as measured in terms of bitdepth) of internal factor implies more additions and shifts. The exemplary values for internal factors as shown in Table 7 may require 348 additions and 156 shifts to implement a 32-point DCT-II 52. The choice of internal factors may depend on the context in which these are employed. The hardware or software architecture used to implement the transform, desired accuracy of the transform in terms of closeness to 32-point DCT-II, and power consumption requirements are some of the factors that may be considered in the choice of internal factors.

In H.264 and HEVC Test model (HM), quantization unit 40 implements the quantization operation as a multiplication by an entry in the quantization matrix followed by a right shift. The entry in the quantization matrix and the right shift are chosen such that together, these two operations approximate division by the actual quantizer step-size. Similarly, there is a corresponding dequantization matrix and a right shift on the decoder side. Let the right shifts on the encoder and decoder be denoted by Q_BITS and DQ_BITS, respectively. In case of scaled transforms, the scaling factors are absorbed into quantization and dequantization matrices in the manner noted above.

For H.264 and HEVC Test model, the quantizer step-size doubles for every 6 values of QP. Thus for a scaled 32×32 transform, the quantization and the dequantization matrix each, typically, requires 32×32×6=6144 entries. In contrast, an orthonormal transform would need only six entries to be stored. Typically, however, in order to implement an orthonormal transform, more multiplications are needed, which can be computationally expensive. The techniques described in this disclosure may reduce the amount of storage needed while maintaining the computational complexity advantage of the factorization described above.

Thus, for 32-point DCT-II unit 52, the scale factors may comprise those set forth in the above Table 1. Analyzing Table 1, there are only 12 distinct scaling factors for a 32-point transform. Letting QP denote the quantizer step-size parameter, consider the following equation (12):

$$QP_{per} = \frac{QP}{6}; \text{ and } QP_{rem} = QP \% 6. \tag{12}$$

In equation (12) above, the modulo operator is represented by the percentage sign (%). Typically, for each $QP_{rem}=0$, 1, ..., 5, a 32×32 matrix would generally have to be stored. However, since there are only 12 distinct entries, for each of $QP_{rem}=0, 1, \ldots, 5$, only a 12×12 matrix may be required to be stored. In addition, a look up table of size 12 may be required to convert the position index into the index in the normalization table. Horizontal and vertical directions use the same look up table. Q_BITS and DQ_BITS may be chosen such that the quantization matrix entries need 16 bits whereas the dequantization matrix entries need only 8 bits. Thus, the total storage for quantization matrix, dequantization matrix and look up table is potentially only 12×12×6× 3+12=2604 bytes.

Although 16, 8 and 4-point transforms may already be present in the even-indexed entries of the 32-point DCT-II transform, the scale factors may differ due to the additional scale factor of $\sqrt{2/N}$. To potentially eliminate the need for different quantization matrices for 32, 16, 8 and 4-point transforms, Q_BITS and DQ_BITS, which represent the precision of the quantization matrices, may be varied. For example, if Q_BITS and DQ_BITS are 10 and 8 for a 4×4 transform, they may be chosen to be 11 and 9, respectively, for an 8×8 transform. In this manner, compensation for the additional scaling factor of 2/N (for the 2-D transform) may be achieved. For every higher block size such as 16×16 and 32×32, the Q_BITS and DQ_BITS may be incremented by 1. This has the effect that the quantizer and dequantizer matrices for the 32×32 DCT-II transform may contain all matrices of lower block sizes (4×4, 8×8, and 16×16). As a result, additional lookup tables (LUTs) of size 16, 8 and 4 may be needed.

In some instances, the implementation described above may requires extensive amounts of storage for quantization. To reduce the amount of storage required, the techniques may provide for an implementation that does not strictly adhere to the orthogonality property. To illustrate, instead of using equations (8) and (10) to choose the internal parameters for the factorization, the sine and cosine terms may be approximated by nearest dyadic rationals with a denominator of 256. For the 16 point butterfly implied by Givens rotation matrix $R_{16}$ in the odd part of 32-point DCT Type II (similar to those in Table 20), the factors are 13, 38, 62, 86, 109, 132, 152, 172, 190, 206, 220, 231, 241, 248, 253, 255. For the 8-point butterfly implied by Givens rotation matrix $R_8$ in the odd part of 16-point DCT Type II, the factors are 25, 74, 121, 162, 198, 226, 245, and 255. For the 4-point butterfly implied by Givens rotation matrix R4 in the odd part of 8-point DCT Type II, the factors are 50, 142, 213, and 251. For the odd part of the 4-point DCT of type II, the factors are 98 and 236. While described with respect to a denominator of 256, other denominators which are a power of two can be chosen. In that case, numerators constants can again be derived similarly to approximate sines and cosines as described above. If a higher power of 2 is used as the denominator, the approximation to sine and cosine terms may be more accurate, which in turn means that the design may be closer to an unlimited precision 32-point DCT-II implementation. As discussed previously, different powers of 2 may be chosen as denominators for R16, R8, R4, and R2. When such a design of internal factors is used, the scale factors can be approximated by those in Table 9 below. This is possible because because $(\sin \theta)^2+(\cos \theta)^2=1$ and the dyadic rationals chosen are close approximations of the sine and cosine terms.

TABLE 9

| index | Norm Factor | index | Norm Factor | index | Norm Factor | index | Norm Factor |
|---|---|---|---|---|---|---|---|
| 0 | 1/sqrt(2) | 8 | 1.0 | 16 | 1/sqrt(2) | 24 | 1.0 |
| 1 | 1.0 | 9 | 1.0 | 17 | 1/sqrt(2) | 25 | 1.0 |
| 2 | 1.0 | 10 | 1.0 | 18 | 1/sqrt(2) | 26 | 1.0 |
| 3 | 1/sqrt(2) | 11 | 1.0 | 19 | 1.0 | 27 | 1/sqrt(2) |
| 4 | 1/sqrt(2) | 12 | 1.0 | 20 | 1.0 | 28 | 1/sqrt(2) |
| 5 | 1/sqrt(2) | 13 | 1.0 | 21 | 1.0 | 29 | 1/sqrt(2) |
| 6 | 1.0 | 14 | 1/sqrt(2) | 22 | 1.0 | 30 | 1.0 |
| 7 | 1.0 | 15 | 1/sqrt(2) | 23 | 1.0 | 31 | 1.0 |

From Table 9 it can be seen that there are now only two distinct scale factors for a one-dimensional transform, 1.0 and $1/\sqrt{2}$. Thus, when these scale factors are absorbed into the quantization and dequantization matrices, for the two-dimensional case, there may be only four distinct numbers in the quantization and dequantization matrix. Thus, it is generally sufficient to store a one-bit look-up table 41 (LUT) of size 32 to specify which of the two distinct normalization factors will be used for normalization of a specific transform coefficient in that direction (horizontal/vertical). The same LUT can be used to specify the normalization factors in the other direction. Thus, for each increment in QP, four distinct values may have to be stored for the quantization matrix as well as the dequantization matrix. Thus, the quantization matrix size may include 2×2×6=24 entries and likewise for the dequantization matrix.

For an orthogonal design there may be 12 distinct scale factors, whereas we have described a design that has only two distinct scale factors for a one-dimensional transform. It is possible to have the number of distinct scale factors between two and 12. For example, if the orthogonal design is retained for 4 and 8-point DCT-II transforms but the internal factors corresponding to R8 and R16 are chosen according to the above method, there are 5 distinct scale factors. These are $$1, \frac{1}{\sqrt{2}}, \frac{1}{Z4}, \frac{1}{\sqrt{2} \times Z8}, \text{ and } \frac{1}{Z8}.$$

This represents a compromise between the amount of storage, orthogonality and bitdepth needed to store internal factors. Such a choice of internal factors is shown in Table 10 below. In this case the quantization as well as the dequantization matrix may include 5×5×6=150 entries.

Similarly, if the orthogonal design is retained for 4, 8 and 16-point DCT-II transforms but the internal factors corresponding to R16 are chosen according to the above method, there are only 7 distinct scale factors. In this case the quantization as well as the dequantization matrix may include 7×7×6=294 entries. Thus by choosing the number of block sizes for which an orthogonal design is maintained, the amount of storage for quantization and dequantization matrices can be varied.

TABLE 10

| A4 | B4 | A8 | B8 | C8 | D8 |
|---|---|---|---|---|---|
| 17/64 | 41/64 | 111/128 | 22/128 | 94/128 | 63/128 |

| A16 | B16 | C16 | D16 | E16 | F16 | G16 | H16 |
|---|---|---|---|---|---|---|---|
| 1019/1024 | 100/1024 | 980/1024 | 297/1024 | 903/1024 | 483/1024 | 792/1024 | 650/1024 |

| A32 | C32 | E32 | G32 | I32 | K32 | M32 | O32 |
|---|---|---|---|---|---|---|---|
| 1023/1024 | 1013/1024 | 993/1024 | 964/1024 | 926/1024 | 878/1024 | 822/1024 | 759/1024 |

| B32 | D32 | F32 | H32 | J32 | L32 | N32 | P32 |
|---|---|---|---|---|---|---|---|
| 50/1024 | 150/1024 | 249/1024 | 345/1024 | 438/1024 | 526/1024 | 610/1024 | 688/1024 |

To illustrate how such a LUT may be employed, consider the following steps. In a first step, quantization unit 40 uses the one-bit LUT on the horizontal index to derive Hor_Bit (0 or 1). Zero corresponds to normalization factor of 1.0 and one corresponds to normalization factor of $1/\sqrt{2}$. In a second step, quantization unit 40 uses the one-bit LUT on the vertical index to derive Ver_Bit (0 or 1). Quantization unit 40 then uses Hor_Bit and Ver_Bit and the QP value to look up the appropriate entry in the quantization and dequantization matrix. In this manner, the techniques may maintain relative computation complexity in comparison to other designs or implementations that provide similar error levels without greatly increasing storage requirements (and associated costs).

While described in the example of FIG. 4 with respect to a DCT-II unit, this DCT-II unit may also represent an IDCT constructed in accordance with the techniques of this disclosure. Forming an inverse DCT from the implementation shown in the example of FIG. 4 involves reversing the inputs and the outputs such that inputs are received by the implementation on the right of FIG. 4 and outputs are output at the left of the implementation. In other words, inverting the implementation about the vertical access such that the inputs then become the outputs and the outputs become the inputs would generally produce the IDCT implementation. For ease of illustration purposes and considering that forming an IDCT from a DCT is well known in the art, these additional IDCT implementations are not shown in separate FIGS.

Figure 5:
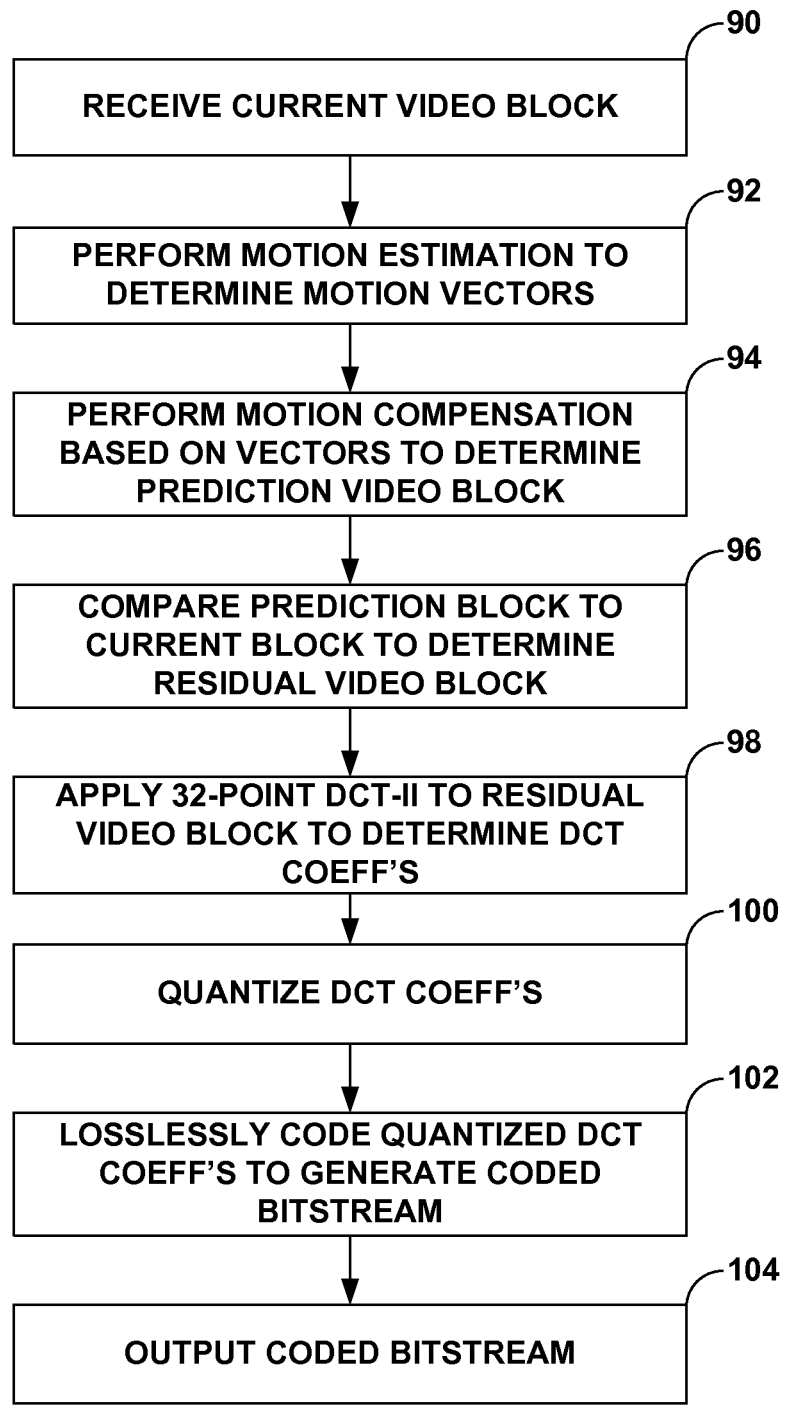
FIG. 5 is a flow chart illustrating exemplary operation of a coding device in applying a 32-point DCT implementation constructed in accordance with the techniques of this disclosure.

FIG. 5 is a flow chart illustrating exemplary operation of a coding device, such as video encoder 20 of FIG. 2, in applying a 32-point DCT implementation constructed in accordance with the techniques of this disclosure. Initially, video encoder 20 receives a current coding unit 31 within a video frame to be encoded (90). Motion estimation unit 32 performs motion estimation to compare coding unit 31 to blocks in one or more adjacent video frames to generate one or more motion vectors (92). The adjacent frame or frames may be retrieved from memory 34. Motion estimation may be performed for blocks of variable sizes, e.g., 64×64, 32×32, 16×16, 16×8, 8×16, 8×8, 4×4 or smaller block sizes. Motion estimation unit 32 identifies one or more blocks in adjacent frames that most closely matches the current coding unit 31, e.g., based on a rate distortion model, and determines displacement between the blocks in adjacent frames and the current coding unit. On this basis, motion estimation unit 32 produces one or more motion vectors (MV) that indicate the magnitude and trajectory of the displacement between current coding unit 31 and one or more matching blocks from the reference frames used to code current coding unit 31. The matching block or blocks will serve as predictive (or prediction) blocks for inter-coding of the block to be coded.

Motion vectors may have half- or quarter-pixel precision, or even finer precision, allowing video encoder 20 to track motion with higher precision than integer pixel locations and obtain a better prediction block. When motion vectors with fractional pixel values are used, interpolation operations are carried out in motion compensation unit 36. Motion estimation unit 32 identifies the best block partitions and motion vector or motion vectors for a coding unit using certain criteria, such as a rate-distortion model. For example, there may be more than one motion vector in the case of bi-directional prediction. Using the resulting block partitions and motion vectors, motion compensation unit 36 forms a prediction unit (94).

Video encoder 20 forms a residual coding unit by subtracting the prediction unit produced by motion compensation unit 36 from the original, current coding unit 31 at summer 48 (96). Transform unit 38 applies a transform producing residual transform block coefficients. Transform unit 38 includes 32-point DCT-II unit 52 configured in accordance with the techniques described in this disclosure. Transform unit 38 invokes scaled 32-point DCT-II unit 52 to apply one or more DCTs-II of a given size to the residual data to produce correspondingly sized blocks of residual transform coefficients in the manner described above. Referring to the example of FIGS. 4A-4E, 32-point DCT-II unit 52 may invoke one or more of 16-point DCT-II unit 73 and 8-point DCT-II units 74A, 74B to concurrently apply one or more 16-point DCT-II and 8-point DCTs-II. Alternatively, 32-point DCT-II unit 52 may invoke one or more of 8-point DCT-II unit 73, 4-point DCT-II units 76B, 76C and 8-point DCT-II units 74A, 74B to concurrently apply one or more 8-point DCTs and 4-point DCTs-II. In yet another alternative, 32-point DCT-II unit 52 may invoke units 73, 74A, and 74B to apply a 32-point DCT-II. In another alternative, 32-point DCT-II unit 52 may invoke one or more of 4-point DCT-II unit 76A-76C and 8-point DCT-II units 74A, 74B to apply one or more 4-point DCTs-II and 8-point DCTs-II.

32-point DCT-II unit 52 generally transforms the residual data from the spatial domain, which is represented as residual pixel data, to the frequency domain, which is represented as DCT coefficients. In this way, 32-point DCT-II unit 52 applies a one or more correspondingly sized DCTs-II to residual data to determine DCT coefficients (98). The transform coefficients may comprise DCT coefficients that include at least one DC coefficient and one or more AC coefficients.

Quantization unit 40 quantizes (e.g., rounds) the residual transform block coefficients to further reduce bit rate (100). As mentioned above, quantization unit 40 accounts for the scaled nature of scaled 32-point DCT-II unit 52 by incorporating factors removed during factorization. As quantization typically involves multiplication, incorporating these factors into quantization unit 40 may not increase the implementation complexity of quantization unit 40. In this respect, removing the factors from scaled 32-point DCT-II unit 52 may decrease the implementation complexity of DCT-II unit 52 without increasing the implementation complexity of quantization unit 40 in the manner shown above, resulting in a net decrease of implementation complexity with respect to video encoder 20.

Entropy coding unit 46 entropy codes the quantized coefficients to even further reduce bit rate. Entropy coding unit 46 performs a statistical lossless coding, referred to in some instances, as entropy coding to generate a coded bitstream (102). Entropy coding unit 46 models a probability distribution of quantized DCT coefficients and selects a codebook based on the modeled probability distribution. Using this codebook, entropy coding unit 46 selects codes for each quantized DCT coefficient in a manner that compresses quantized DCT coefficients. Entropy coding unit 46 outputs the entropy coded coefficients as a coded bit-stream which is stored to a memory or storage device and/or sent to video decoder 30 (104).

Reconstruction unit 42 and inverse transform unit 44 reconstruct quantized coefficients and apply inverse transformation, respectively, to reconstruct the residual data. Again, inverse transform unit 44 may include an inverse DCT (IDCT), which is commonly referred to as a DCT of type III that performs the inverse operations of 32-point DCT-II unit 73, similar to 32-point DCT-III unit 68 described below with respect to FIG. 3. Summation unit 50 adds the reconstructed residual data to the motion compensated prediction block produced by motion compensation unit 36 to produce a reconstructed coding unit for storage in memory 34. The reconstructed coding unit is used by motion estimation unit 32 and motion compensation unit 36 to encode a block in a subsequent video frame.

Figure 6:
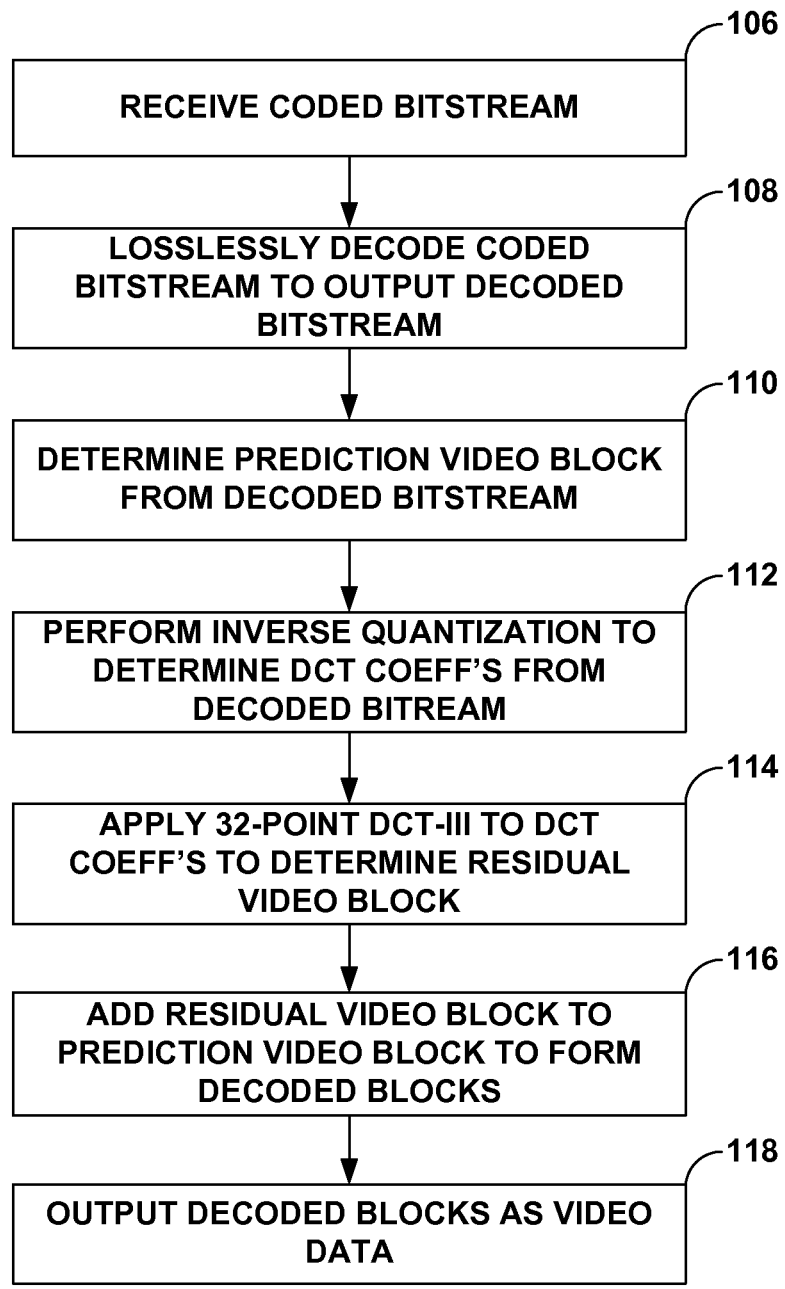
FIG. 6 is a flowchart illustrating example operation of a coding device in applying a 32-point DCT-III configured in accordance with the techniques of this disclosure.

FIG. 6 is a flowchart illustrating example operation of a coding device, such as video decoder 30 of FIG. 3, in applying a 32-point DCT-III configured in accordance with the techniques of this disclosure. Video decoder 30 receives an encoded video bitstream that has been encoded by video encoder 20. In particular, entropy decoding unit 54 receives the encoded video bitstream and decodes from the bitstream quantized residual coefficients and quantized parameters, as well as other information, such as macroblock coding mode and motion information, which may include motion vectors and block partitions (106, 108). Motion compensation unit 56 receives the motion vectors and block partitions and one or more reconstructed reference frames from memory 62 to produce a prediction unit (110).

Reconstruction unit 58 inverse quantizes, i.e., de-quantizes, the quantized block coefficients (112). Inverse transform unit 60 applies an inverse transform, e.g., an inverse DCT, to the coefficients to produce residual data. More specifically, inverse transform unit 60 includes a scaled 32-point DCT-III unit 68, which inverse transform unit 60 invokes to process the coefficients and thereby generate residual data (114). Scaled 32-point DCT-III unit 68, which is the inverse of scaled 32-point DCT-II unit 52 shown in FIG. 2, may transform the coefficients from the frequency domain to the spatial domain to produce the residual data in the manner described above. Similar to quantization unit 40 above, reconstruction unit 58 accounts for the scaled nature of 32-point DCT-III unit 68 by incorporating the external factors removed during factorization into the reconstruction process with little if any increase in implementation complexity. Removing factors from scaled 32-point DCT-III unit 68 may reduce implementation complexity, thereby resulting in a net decrease of complexity for video decoder 30.

The prediction units are then summed by summer 66 with the residual data to form decoded blocks (116). A deblocking filter (not shown) may be applied to filter the decoded blocks to remove blocking artifacts. The filtered blocks are then placed in memory 62, which provides reference frame for decoding of subsequent video frames and also produces decoded video to drive a display device, such as display device 28 of FIG. 1 (118).

FIGS. 7A-7E are diagrams illustrating various aspects of another exemplary implementation of 32-point DCT-II unit 52 of FIG. 2. In FIGS. 4A-4E, an example implementation of 32-point DCT-II unit 52 is shown using butterflies, where this exemplary implementation does not involve much if any matrix multiplication for the reasons stated above. In other words, 32-point DCT II unit 52 may implement the transforms of various sizes described above without performing matrix multiplications. However, so-called "partial butterfly" implementations of DCT-II units have been adopted into the working draft and test model (HM5.0) of the emerging HEVC standard and the techniques described in this disclosure may be implemented with respect to these partial butterfly implementations. The partial butterfly DCT-II implementations may involve a combination of decomposition into a butterfly stage (which may also be referred to as a "sum and difference" stage) followed by a transform of size N/2 for the even portion, where N denotes the size of the DCT-II. For the odd portion, an N/2 point matrix multiplication is used rather than the butterfly implementation shown above with respect to the example of FIGS. 4D, 4E.

For example, a proposed partial butterfly 8-point DCT requires a 4×4 matrix multiply, which may not be very costly in terms of computation complexity, even when using general purpose multipliers. However, when using partial butterfly implementation for a 16-point and 32-point transform requires 8×8 and 16×16 matrix multiply, respectively. This may be costly in terms of hardware area and may also impact power conservation, particularly for mobile or battery-powered devices. The techniques may be implemented with respect to these partial butterfly DCT-II implementations to potentially reduce consumption of board space by nesting these partial butterfly DCT-II implementations in the manner described above and shown with respect, in one instance, to the examples of FIGS. 4A-4E.

Figure 7A:
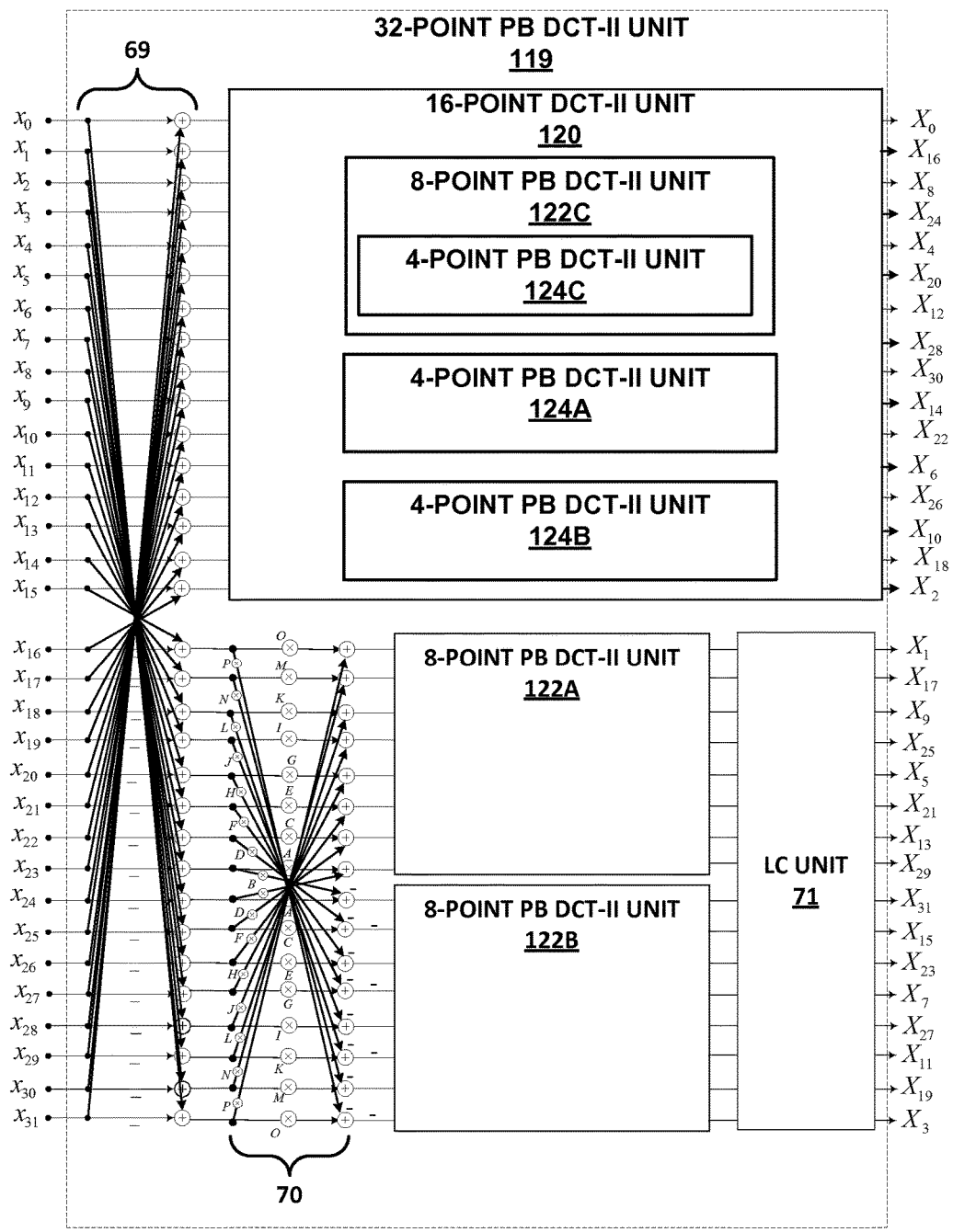
FIGS. 7A-7E are diagrams illustrating various aspects of another exemplary implementation of 32-point DCT-II unit shown in FIG. 2.

FIG. 7A is a diagram showing an example partial butterfly (PB) implementation 119 of 32-point DCT-II unit 52 shown in the example of FIG. 2. In the example of FIG. 7A, 32-point DCT-II unit 119 includes substantially similar butterfly unit 69, Givens rotation matrix 70 and linear combination (LC) unit 71 as those shown above with respect to the butterfly implementation of DCT-II unit 52 shown in the example of FIG. 4A. However, 32-point PB DCT-II unit 119 includes a 16-point PB DCT-II unit 120 in the even portion and two 8-point PB DCT-II units 122A, 122B in the odd portion. 16-point PB DCT-II unit 120 further includes an 8-point PB DCT-II unit 122C in the even portion and two 4-point PB DCT-II units 124A, 124B in the odd portion. 8-point PB DCT-II unit 122C also includes a 4-point PB DCT-II unit 124C in its even portion.

In some instances, the scale or normalization factors on the right side of FIG. 2 may change. This change is due to the basis functions used in the PB units having approximately the same norms. So all the transform coefficients in the upper half of the 16-point transform will have a single normalization factor. Similarly, there will be a single scaling factor for the transform coefficients in the lower half of the 16-point transform. This scaling factor would take into account the scaling factor for the PB transforms and the scaling factor Z16 arising from the butterfly factors in the Givens rotation matrix R8. Thus, there may only be 2 different scaling or normalization factors to make the transform orthonormal. The same concept can be extended to 32-point transform by reusing the above described 16-point transform in the upper half and using 8-point PB transforms and Givens rotation matrix R16 in the lower half. In this case, 3 different scaling or normalization factors may be needed to make the transform orthonormal.

Figure 7B:
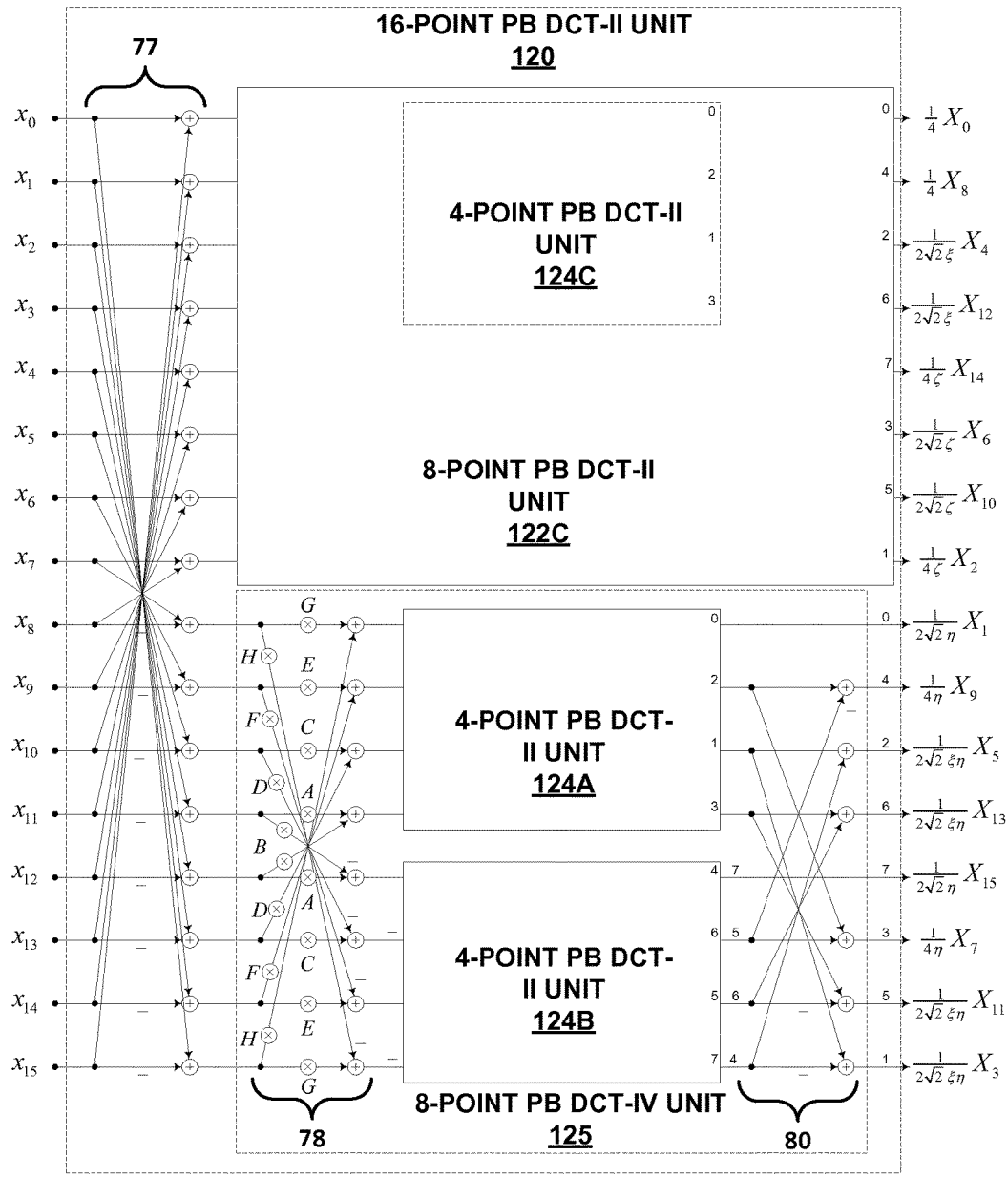

FIG. 7B is a diagram showing 16-point PB DCT-II unit 120 shown in the example of FIG. 7A in more detail. 16-point PB DCT-II unit 120 includes butterfly units 77, 78 and Givens rotation matrix 80, which is substantially similar to 16-point DCT-II 73 shown in the example of FIG. 4B. However, rather than include butterfly implementations of 4-point DCTG-II units 76 and 8-point DCT-II unit 72, 16-point PB DCT-II unit 120 includes above noted 4-point partial butterfly (PB) DCT-II units 124A-124C and 8-point PB DCT-II unit 122C. The lower or odd 4-point PB DCT-II units 124A, 124B may also form an 8-point DCT-IV unit 125 similar to that described above with respect to 16-point DCT-II unit 73 shown in the example of FIG. 4B.

Figure 7C:
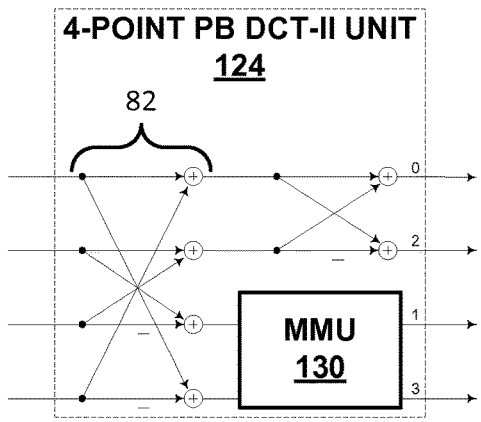

FIG. 7C is a diagram showing 4-point PB DCT-II unit 124 in more detail. In the example of FIG. 7C, 4-point PB DCT-II unit 124 is similar to 4-point DCT-II unit 76 shown in the example of FIG. 4C in that 4-point PB DCT-II unit 124 includes a butterfly unit 82. Butterfly unit 82 rearranges the inputs into even and odd inputs, as denoted by the '0' and '2' notation on the two upper outputs and the '1' and '3' notation on the two lower outputs. The portion of 4-point PB DCT-II unit 124 that operates on the odd inputs may be referred to as the odd portion while the portion that operates on the even inputs may be referred to as the even portion.

The even portion of 4-point PB DCT-II unit 124 is substantially similar to that described above with respect to 4-point DCT-II unit 76. In the odd portion, rather than include a butterfly, 4-point PB DCT-II unit 124 includes a matrix multiplication unit (MMU) 130 ("MMU 130"). Matrix multiplication unit 130 may perform matrix multiplication on the odd inputs. The coefficients of the matrix in MMU 130 used to perform the multiplication may be as shown in Table 11 below. This matrix is used in the latest HEVC Test Model (HM5.0). It may be necessary to introduce a right shift after matrix multiplication stage to normalize output values.

TABLE 11

| 83 | 36 |
|---|---|
| 36 | −83 |

Figure 7D:
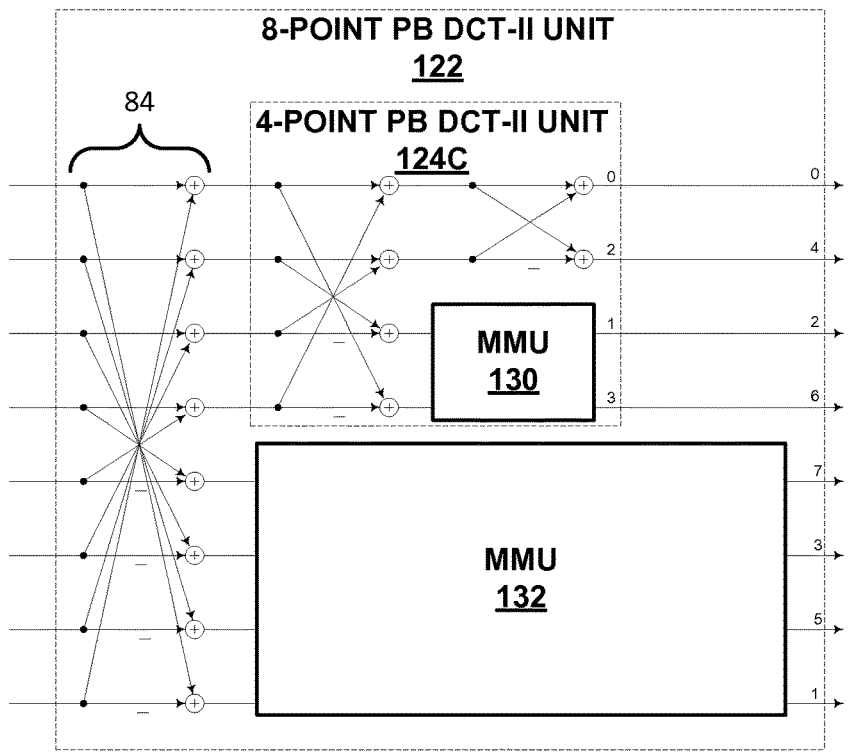

FIG. 7D is a block diagram illustrating 8-point PB DCT-II unit 122 in more detail. In the example of FIG. 7D, 8-point PB DCT-II unit 122 includes a butterfly unit 84 that is substantially similar to butterfly unit 84 described above with respect to 8-point DCT-II unit 72 shown in the example of FIG. 4D. In any event, butterfly unit 84 rearranges its inputs into even and odd inputs while also performing cross-additions to generate the even inputs and cross-subtractions to generate the odd inputs. The portion of 8-point PB DCT-II unit 122 that operates on the even inputs may be referred to as the even portion while the portion that operates on the odd inputs may be referred to as the odd portion. The even portion in this instance comprises a nested 4-point PB DCT-II unit 124C, which is substantially similar to 4-point DCT-II unit 124 described above with respect to the example of FIG. 7C.

The even portion of 8-point PB DCT-II unit 122 is substantially similar to that described above with respect to 8-point DCT-II unit 72. In the odd portion, however, rather than include a butterfly, 8-point PB DCT-II unit 122 includes a matrix multiplication unit (MMU) 132 ("MMU 132"). Matrix multiplication unit 132 may perform matrix multiplication on the odd inputs. The coefficients of the matrix in MMU 132 used to perform the multiplication may be as shown in Table 12 below. This matrix is used in the latest HEVC Test Model (HM5.0). It may be necessary to introduce a right shift after matrix multiplication stage to normalize output values.

TABLE 12

| 89 | 75 | 50 | 18 |
|---|---|---|---|
| 75 | −18 | −89 | −50 |
| 50 | −89 | 18 | 75 |
| 18 | −50 | 75 | −89 |

Figure 7E:
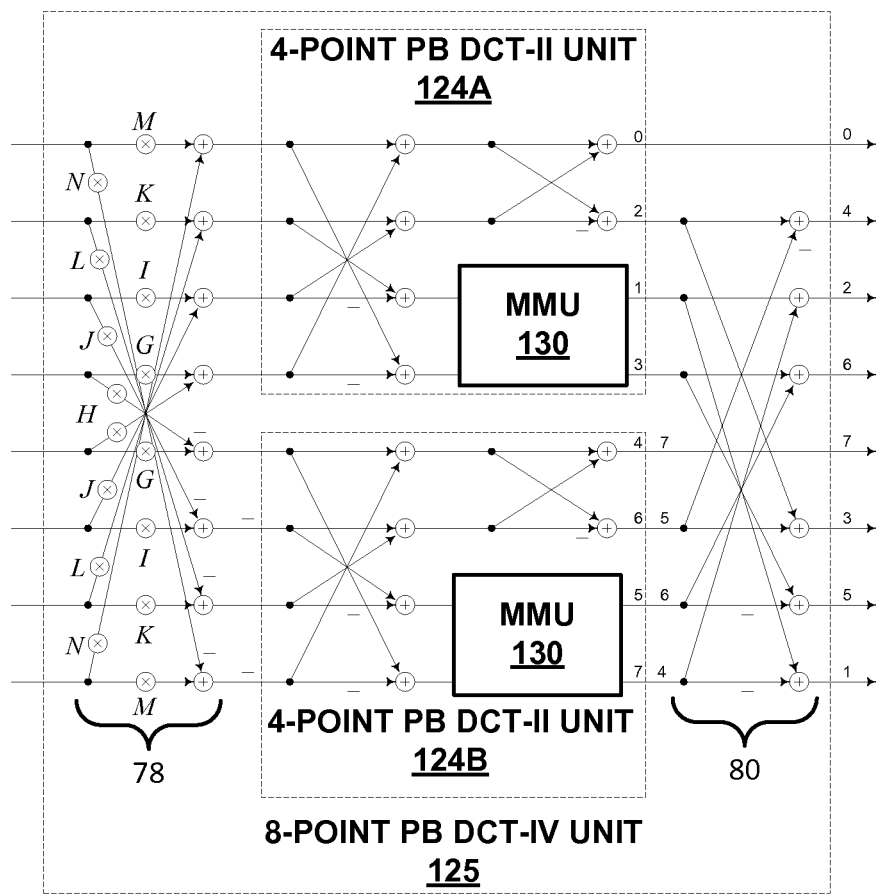

FIG. 7E is a block diagram illustrating 8-point PB DCT-IV unit 125 in more detail. In the example of FIG. 7E, 8-point PB DCT-IV unit 125 includes, as noted above, two 4-point DCT-II units 124A, 124B, each of which may be substantially similar to 4-point DCT-II unit 124 described above with respect to the example of FIG. 7C. 8-point DCT-IV unit 125, again as noted above, also includes factor multiplication unit 78 and cross-additive unit 80. Factor multiplication unit 78 multiplies the inputs to 8-point DCT-IV unit 125 by factors H, I, J, K, L, M, and N, and once multiplied by the factors, cross-adds the upper four inputs with the lower four inputs and cross-subtracts the upper four inputs from the lower four inputs. The upper four inputs then are processed by 4-point DCT-II unit 124A, while the lower four inputs are processed by 4-point DCT-II unit 124B. Cross-additive unit 80 then cross adds/subtracts (where subtraction is consider another form of addition) the lower seven inputs.

While described above with respect to DCT-II and DCT-III of size 32 that includes one or more nested 16-point DCT-II and DCT-III and 8-point DCT-II and DCT-III as well as one or more nested 4-point DCT-II and DCT-III, the techniques should not be limited to these particular sizes. Instead, the techniques may apply to any DCT-II or DCT-III of any size that includes smaller sized nested DCTs-II and -III. Consequently, the techniques should not be limited in this respect to the examples set forth in this disclosure.

The techniques of this disclosure may be implemented in a wide variety of devices or apparatuses, including a wireless communication device handset such as a mobile phone, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware, software, firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium that is a physical non-transitory structure, and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various aspects of the techniques have been described. These and other aspects are within the scope of the following claims.

What is claimed is:

1. A method for transforming video data between a spatial domain and a frequency domain, the method comprising:
    performing one or more of multiple scaled discrete cosine transforms of type II (DCTs-II) of different sizes with a scaled 32-point DCT-II transform unit of a video coding device to transform a portion of the video data between the spatial domain and the frequency domain, wherein the scaled 32 DCT-II transform unit performs a first one of the plurality of scaled DCTs-II of size 32, wherein the multiple scaled DCTs-II include 32 internal fixed-point factors selected such that each of the multiple scaled DCTs-II satisfies an orthogonality property, wherein the scaled 32-point DCT-II transform unit includes:
    a scaled 16-point DCT-II transform unit located in an even half of the scaled 32-point DCT-II transform unit that performs a second one of the multiple scaled DCTs-II, the second one of the multiple scaled DCTs-II defining a transform size of 16;
    a first scaled 8-point DCT-II transform unit located in an odd half of the scaled 32-point DCT-II transform unit that performs a third one of the multiple scaled DCTs-II, the third one of the multiple scaled DCTs-II defining a transform size of 8;
    a second scaled 8-point DCT-II transform unit located in the odd half of the scaled 32-point DCT-II transform unit that performs a fourth one of the multiple scaled DCTs-II, the fourth one of the multiple scaled DCTs-II defining a transform size of 8; and
    a 16-point butterfly unit defined by a Givens rotation matrix located in the odd half of the scaled 32-point DCT-II transform unit.

2. The method of claim 1, wherein performing the one or more of the multiple scaled DCTs-II comprises performing the second one of the multiple scaled DCTs-II of size 16 concurrent to performing the either the third one or the fourth one of the multiple scaled DCTs-II of size 8.

3. The method of claim 1,
    wherein the scaled 16-point DCT-II transform unit includes:
        a third 8-point DCT-II transform unit;
        a first 4-point DCT-II transform unit; and
        a second 4-point DCT-II transform unit,
    wherein performing the one or more of the multiple scaled DCTs-II of different sizes comprises concurrently performing two or more of the multiple scaled DCTs-II of sizes 8 and 4 with one or more of the first, second, and third 8-point DCT-II transform units and one or more of the first and second 4-point DCT-II transform units.

4. The method of claim 3,
    wherein performing the one or more of the multiple scaled DCTs-II of different sizes comprises:
    performing one of the multiple scaled DCTs-II of size 8 either 1) without performing matrix multiplication or 2) using a combination of butterflies and matrix multiplication; and
    performing one of the multiple scaled DCTs-II of size 4 either 1) without performing matrix multiplication or 2) using a combination of butterflies and matrix multiplication.

5. The method of claim 3, wherein performing the one or more of the multiple scaled transforms of different sizes comprises:
    concurrently performing one of the multiple scaled DCTs-II of size 4 and one of the multiple scaled DCTs-II of size 8; and
    performing one of the multiple scaled DCTs-II of size 8 concurrent to performing the one of multiple scaled DCTs-II of size 4 and the one of the multiple scaled DCTs-II of size 8.

6. The method of claim 5, wherein performing the one of the multiple scaled DCTs-II of size 4 comprises performing the one of the multiple scaled DCTs-II of size 4 either 1) without performing matrix multiplication or 2) using a combination of butterflies and matrix multiplication.

7. The method of claim 1,
    wherein performing the one or more of the multiple scaled DCTs-II of different sizes comprises performing the one or more of the multiple scaled DCTs-II of different sizes with the scaled 32-point DCT-II transform unit to transform the first portion of the video data from the spatial domain to the frequency domain, wherein the method further comprises:
outputting scaled transform coefficients representative of the first portion of the video data in the frequency domain; and
applying scale factors with a quantization unit to the scaled transform coefficients so as to generate quantized full transform coefficients.

8. The method of claim 7, wherein applying the scale factors comprises applying the scale factors using a look-up table (LUT) included within the quantization unit that stores a mapping between the scaled transform coefficients and entries of a quantization matrix.

9. The method of claim 7, wherein applying the scale factors comprises applying the scale factors based on a mapping between the scaled transform coefficients and entries of a quantization matrix with the quantization matrix of a size that is smaller than a full quantization matrix specifying scale factors for each of the scaled transform coefficients, and is dependent upon one or more of the 32 internal fixed-point factors.

10. The method of claim 1, wherein performing the one or more of the multiple scaled DCTs-II comprises:
performing one of the multiple scaled DCTs-II of size 16 either 1) without performing matrix multiplication or 2) using a combination of butterflies and matrix multiplication, and
performing one of the multiple scaled DCTs-II of size 8 either 1) without performing matrix multiplication or 2) using a combination of butterflies and matrix multiplication.

11. The method of claim 1, further comprising:
performing motion estimation with respect to a block of the video data to identify a reference block of the video data and generate motion vectors based on the identified reference block of video data;
performing motion compensation to determine a prediction block based on the motion vectors;
comparing the prediction block to the block of video data to generate a residual block of video data,
wherein performing the one or more of the multiple scaled DCTs-II of different sizes comprises performing the one or more of the multiple scaled DCTs-II of different sizes to transform the residual block of video data from the spatial domain to the frequency domain;
quantizing the transformed residual block of video data to generate a quantized block of video data; and
performing statistical coding to code the quantized block of video data and generate a coded block of video data.

12. The method of claim 1, further comprising:
statistically decoding a coded block of the video data to generate a quantized block of video data;
performing inverse quantization on the quantized block of video data to generate a transformed block of video data,
wherein performing the one or more of the multiple scaled DCTs-II of different sizes comprises performing the one or more of the multiple scaled DCTs-II to the transformed block of video data so as to generate a residual block of video data; and
performing motion compensation on the residual block of video data to determine a decoded block of the video data.

13. The method of claim 1,
wherein the video coding device comprises a wireless communication device,
wherein the method is executable on the wireless communication device,
wherein the wireless communication device comprises a memory configured to store the video data,
wherein the scaled 32-point DCT-II transform unit comprises a processor configured to execute instructions to perform the one or more of the multiple scale DCTs-II of the different sizes to transform the portion of the video data between the spatial domain and the frequency domain.

14. The method of claim 13,
wherein the wireless communication device comprises a cellular telephone, and
wherein the cellular telephone includes a receiver configured to receive the video data, the video data modulated according to a cellular communication standard.

15. An apparatus comprising:
means for storing a portion of video data;
means for performing multiple scaled discrete cosine transforms of type II (DCTs-II) to transform the portion of the video data between a spatial domain and a frequency domain, the means for performing the multiple scaled DCTs-II including 32 internal fixed-point factors selected such that each of the plurality of scaled transforms satisfies an orthogonality property,
wherein the means for performing the multiple scaled DCTs-II also comprises means for performing a first one of the multiple scaled DCTs-II of size 32;
wherein the means for performing the first one of the multiple scaled DCTs-II of size 32 includes an even half, the even half comprising means for performing a second one of the multiple scaled DCTs-II of size 16;
wherein the means for performing the first one of the multiple scaled DCTs-II of size 32 includes an odd half, the odd half comprising:
means for performing a 16-point butterfly defined by a Givens rotation matrix;
means for performing a third one of the multiple scaled DCTs-II of size 8; and
means for performing a fourth one of the multiple scaled DCTs-II of size 8.

16. An apparatus comprising:
a memory configured to store a portion of video data; and
a scaled 32-point discrete cosine transform of type II (DCT-II) unit configured to perform one or more of multiple scaled DCTs-II of different sizes to transform the portion of the video data between a frequency domain and a spatial domain, wherein the scaled 32-point DCT-II unit is configured to perform a first one of the multiple scaled DCTs-II, wherein the multiple scaled DCTs-II include 32 internal fixed-point factors selected such that each of the plurality of scaled transforms satisfies an orthogonality property, wherein the scaled 32-point DCT-II unit includes:
a scaled 16-point DCT-II unit located in an even half of the scaled 32-point DCT-II unit that performs a second one of the multiple scaled DCTs-II of size 16;
a first scaled 8-point DCT-II unit located in an odd half of the scaled 32-point DCT-II unit that performs a third one of the multiple scaled DCTs-II of size 8;
a second scaled 8-point DCT-II unit located in the odd half of the scaled 32-point DCT-II unit that performs a fourth one of the multiple scaled DCTs-II of size 8; and
a 16-point butterfly unit defined by a Givens rotation matrix located in the odd half of the scaled 32-point DCT-II unit.

17. The apparatus of claim 16, wherein the scaled 16-point DCT-II unit is configured to perform the second one of the multiple scaled DCTs-II of size 16 concurrent to either the first or the second scaled 8-point DCT-II unit performing the respective third or fourth one of the multiple scaled DCTs-II of size 8.

18. The apparatus of claim 16,
wherein the scaled 16-point DCT-II unit includes:
a third 8-point DCT-II unit;
a first 4-point DCT-II unit; and
a second 4-point DCT-II unit,
wherein one or more of the first, second and third 8-point DCT-II units and the first and second 4-point DCT-II units are configured to concurrently perform two or more of the multiple scaled DCTs-II of sizes 8 and 4, respectively.

19. The apparatus of claim 18,
wherein the first, second and third 8-point DCT-II units are configured to each perform one of the multiple scaled DCTs-II either 1) without performing matrix multiplication or 2) using a combination of butterflies and matrix multiplication, and
wherein the first and second 4-point DCT-II units are configured to each perform one of the multiple scaled DCTs-II either 1) without performing matrix multiplication or 2) using a combination of butterflies and matrix multiplication.

20. The apparatus of claim 18,
wherein the first 8-point DCT-II unit also includes a third 4-point DCT-II unit, and
wherein the first, second and third 4-point DCT-II units and the second and third 8-point DCT-II units are configured to concurrently perform three of the multiple scaled DCTs-II of size 4 and two of the multiple scaled DCTs-II of size 8.

21. The apparatus of claim 20, wherein the third 4-point DCT-II unit is configured to perform one of the multiple scaled DCTs-II either 1) without performing matrix multiplication or 2) using a combination of butterflies and matrix multiplication.

22. The apparatus of claim 16,
wherein the scaled 32-point DCT-II unit is configured to output scaled transform coefficients, and
wherein the apparatus further comprises a quantization unit configured to apply scale factors to the scaled transform coefficients so as to generate quantized full transform coefficients.

23. The apparatus of claim 22, wherein the quantization unit is configured to apply the scale factors using a look-up table (LUT) included within the quantization unit that stores a mapping between the scaled transform coefficients and entries of a quantization matrix.

24. The apparatus of claim 23,
wherein a size of the quantization matrix is smaller than a full quantization matrix that specifies scale factors for each of the scaled transform coefficients, and
wherein the size of the quantization matrix is dependent upon one or more of the 32 internal fixed-point factors.

25. The apparatus of claim 16,
wherein the scaled 16-point DCT-II unit is configured to perform the second one of multiple scaled DCTs-II either 1) without performing matrix multiplication or 2) using a combination of butterflies and matrix multiplication, and
wherein one or more of the first and the second scaled 8-point DCT-II units are configured to perform one or more of the third and fourth ones of the multiple scaled DCTs-II either 1) without performing matrix multiplication or 2) using a combination of butterflies and matrix multiplication.

26. The apparatus of claim 16,
wherein the portion of the video data comprises a block of video data,
wherein the apparatus further comprises:
a motion estimation unit configured to perform motion estimation with respect to the block of video data to identify a reference block of the video data and generate motion vectors based on the identified reference block of video data;
a motion compensation unit configured to perform motion compensation to determine a prediction block based on the motion vectors and compares the prediction block to the block of video data to generate a residual block of video data,
wherein the scaled 32-point DCT-II unit is configured to perform the one or more of the multiple scaled DCTs-II of different sizes to transform the residual block of video data from the spatial domain to the frequency domain;
a quantization unit configured to quantize the transformed residual block of video data to generate a quantized block of video data; and
an entropy coding unit configured to perform statistical coding to code the quantized block of video data and generate a coded block of video data.

27. The apparatus of claim 16,
wherein the first portion of the video data comprises a coded block of video data,
wherein the apparatus further comprises:
an entropy decoding unit configured to statistically decode the coded block of video data to generate a quantized block of video data;
a reconstruction unit configured to perform an inverse quantization on the quantized block of video data to generate a transformed block of video data,
wherein the scaled 32-point DCT-II unit is configured to perform one of the multiple scaled DCTs-II of different sizes to transform the transformed block of video data from the frequency domain to the spatial domain so as to generate a residual block of video data;
a motion compensation unit that performs motion compensation on the residual block of video data to determine a decoded block of the video data.

28. The apparatus of claim 16,
wherein the apparatus comprises a wireless communication device, and
wherein the scaled 32-point DCT-II unit comprises a 32-point DCT-II hardware unit.

29. The apparatus of claim 28,
wherein the wireless communication device comprises a cellular telephone, and
wherein the cellular telephone includes a receiver configured to receive the video data, the video data modulated according to a cellular communication standard.

30. A non-transitory computer-readable medium comprising instructions that, when executed, cause one or more processors to:
perform one or more of a multiple scaled discrete cosine transform of type II (DCTs-II) of different sizes with a scaled 32-point DCT-II unit of a video coding device to transform a portion of the video data between the spatial domain and the frequency domain, wherein the scaled 32 DCT-II unit performs a first one of the plurality of scaled DCTs-II of size 32, wherein the multiple scaled DCTs-II include 32 internal fixed-point factors selected such that each of the multiple scaled DCTs-II satisfies an orthogonality property, wherein the scaled 32-point DCT-II unit includes:
a scaled 16-point DCT-II unit located in an even half of the scaled 32-point DCT-II unit that performs a second one of the multiple scaled DCTs-II, the second one of the multiple scaled DCTs-II defining a transform size of 16;
a first scaled 8-point DCT-II unit located in an odd half of the scaled 32-point DCT-II unit that performs a third one of the multiple scaled DCTs-II, the third one of the multiple scaled DCTs-II defining a transform size of 8;
a second scaled 8-point DCT-II unit located in the odd half of the scaled 32-point DCT-II unit that performs a fourth one of the multiple scaled DCTs-II, the fourth one of the multiple scaled DCTs-II defining a transform size of 8; and
a 16-point butterfly unit defined by a Givens rotation matrix located in the odd half of the scaled 32-point DCT-II unit.

* * * * *